(12) United States Patent
Smith

(10) Patent No.: US 11,888,403 B2
(45) Date of Patent: Jan. 30, 2024

(54) HIGH-BANDWIDTH ANALOG-CONTROLLED DC BREAKER ON DC/DC CONVERTER WITH GALVANIC ISOLATION

(71) Applicant: Government of the United States as represented by the Secretary of the Air Force, Wright-Patterson AFB, OH (US)

(72) Inventor: Nathaniel Smith, Lebanon, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 58 days.

(21) Appl. No.: 17/558,922

(22) Filed: Dec. 22, 2021

(65) Prior Publication Data
US 2022/0115957 A1  Apr. 14, 2022

Related U.S. Application Data

(63) Continuation-in-part of application No. 16/702,608, filed on Dec. 4, 2019, now abandoned.
(Continued)

(51) Int. Cl.
*H02M 3/335* (2006.01)
*H02M 1/32* (2007.01)

(52) U.S. Cl.
CPC ....... *H02M 3/33573* (2021.05); *H02M 1/325* (2021.05); *H02M 3/33571* (2021.05); *H02M 3/33592* (2013.01)

(58) Field of Classification Search
CPC ...... H02H 3/087; H02H 3/021; H02H 7/1213; H02M 3/33523; H02M 3/33553;
(Continued)

(56) References Cited

U.S. PATENT DOCUMENTS

| 5,335,162 A | 8/1994 | Martin-lopez et al. |
| 6,894,468 B1 * | 5/2005 | Bretz ................ H02M 3/33592 |
| | | 323/351 |

(Continued)

FOREIGN PATENT DOCUMENTS

| CN | 103178486 | 2/2013 | |
| CN | 104901265 | 4/2015 | |
| CN | 109256951 A | * 1/2019 | ............. H02M 1/32 |

OTHER PUBLICATIONS

Yasen Harrye; Khaled Ahmed; Ahmed Aboushady; DC Fault Isolation study of Bidirectional Dual Active Bridge DC/DC Converter for DC Transmission Grid Application, IEEE IE Conference Yokohama, Apr. 2015, pp. 3193-3198. (Year: 2015).*

(Continued)

*Primary Examiner* — Harry R Behm
(74) *Attorney, Agent, or Firm* — AFMCLO/JAZ; Chastity D. S. Whitaker

(57) ABSTRACT

A galvanic isolator circuit and method provide for galvanically isolating and current limiting a power source from a load. A direct current (DC) input voltage ("$v_{in}$") and an input current ("$i_{in}$") are received. A full- or half-bridge rectifier is switched to synthesize a first alternating voltage waveform that magnetically couples through a transformer to induce a second alternating voltage waveform with galvanic isolation from the first alternating voltage waveform, preventing potentially-faulted load from a source. The second alternating voltage waveform is rectified to produce a direct current (DC) output voltage ("$v_o$") having output current ("$i_o$") through more than one drive transistor or diode. The more than one primary-side drive transistor is current limited to reduce or prevent brown-out, black-out, or protective race conditions in the non-faulted portions of DC power generation systems and DC distribution electrical power systems.

3 Claims, 24 Drawing Sheets

Related U.S. Application Data

(60) Provisional application No. 62/798,133, filed on Jan. 29, 2019.

(58) Field of Classification Search
CPC ...... H02M 1/32; H02M 1/08; H02M 3/33573; H02M 3/125; H02M 3/33571; H02M 1/325; H02J 1/06
See application file for complete search history.

(56) References Cited

U.S. PATENT DOCUMENTS

| | | | |
|---|---|---|---|
| 7,098,555 | B2 | 8/2006 | Glahn et al. |
| 8,837,171 | B2 | 9/2014 | Schill |
| 2008/0198638 | A1 | 8/2008 | Reinberger et al. |
| 2011/0317452 | A1 | 12/2011 | Anguelov et al. |
| 2015/0137871 | A1 | 5/2015 | Takano |
| 2017/0141570 | A1* | 5/2017 | Vijayan ............. H02M 3/33546 |
| 2017/0338642 | A1 | 11/2017 | Zowislok et al. |
| 2019/0157860 | A1 | 5/2019 | Duvnjak |
| 2020/0280313 | A1* | 9/2020 | Rinne ..................... H02M 1/08 |
| 2020/0395758 | A1* | 12/2020 | Tanaka ..................... H02J 3/38 |

OTHER PUBLICATIONS

D. K. Saini et al., "Average Current-Mode Control of Buck DC-DC Converter with Reduced Control Voltage Ripple," IECON 2016—42nd Annual Conference of the IEEE Industrial Electronics Society (2016) 3270-3275.

M. K. Kazimierczuk, Chapters 8-12 IN: Pulse-Width Modulated Dc-DC Power Converters, Second Ed, Wiley and Sons (2013) 330-520.

J. A. Zengel, "Master of Science in Electrical Engineering: DC-DC Power Conversion with Galvanic Isolation," Auburn University (2002) 103 pages total.

Machine Translation of CN 104901265, accessed Oct. 3, 2023.
Machine Translation of CN 103178486, accessed Oct. 3, 2023.

* cited by examiner

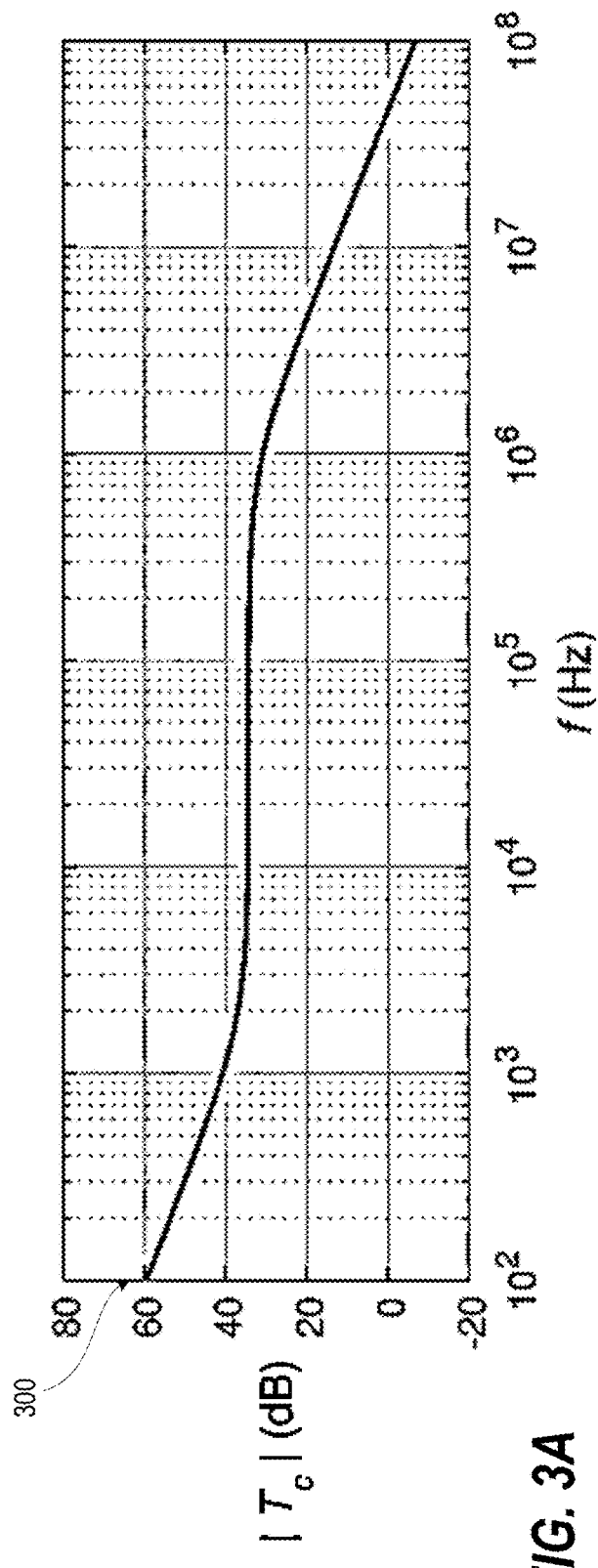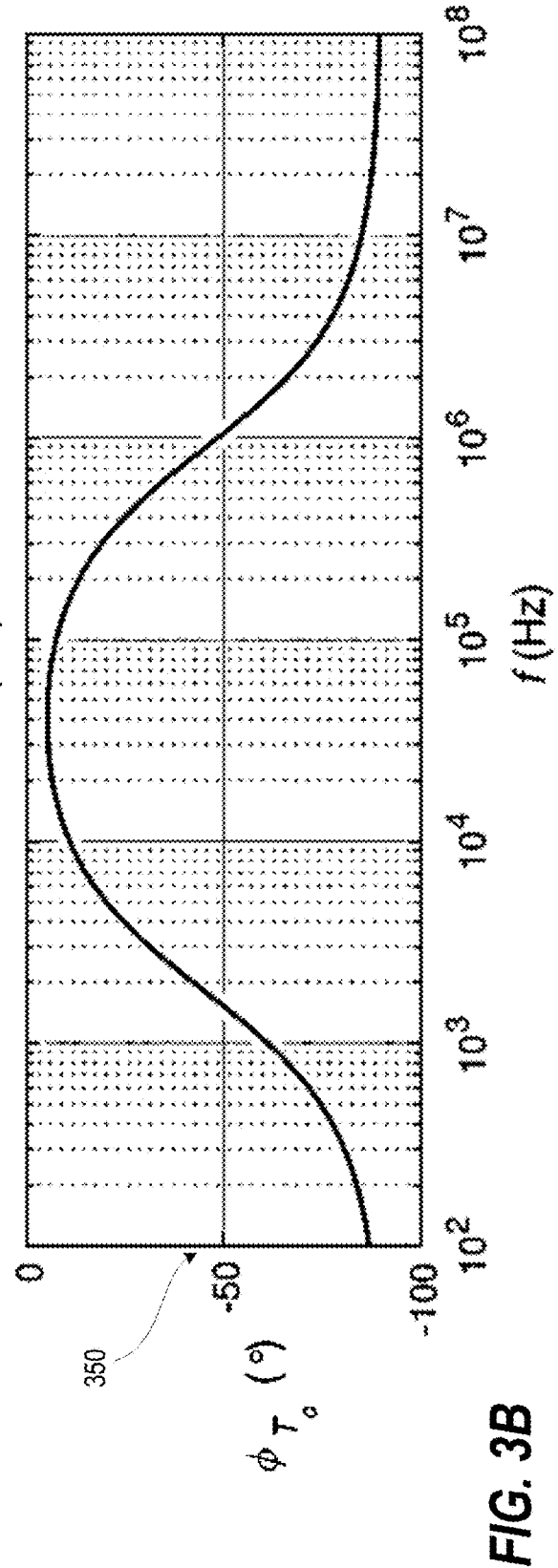
FIG. 3A
FIG. 3B

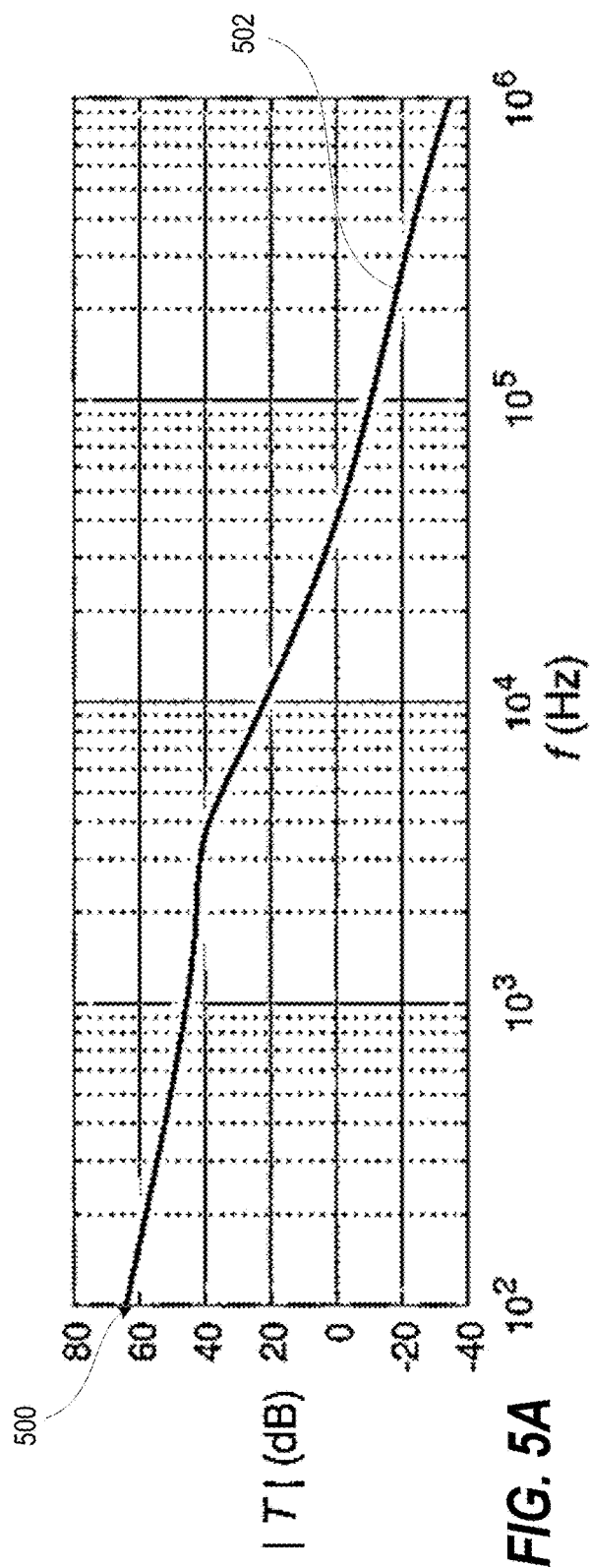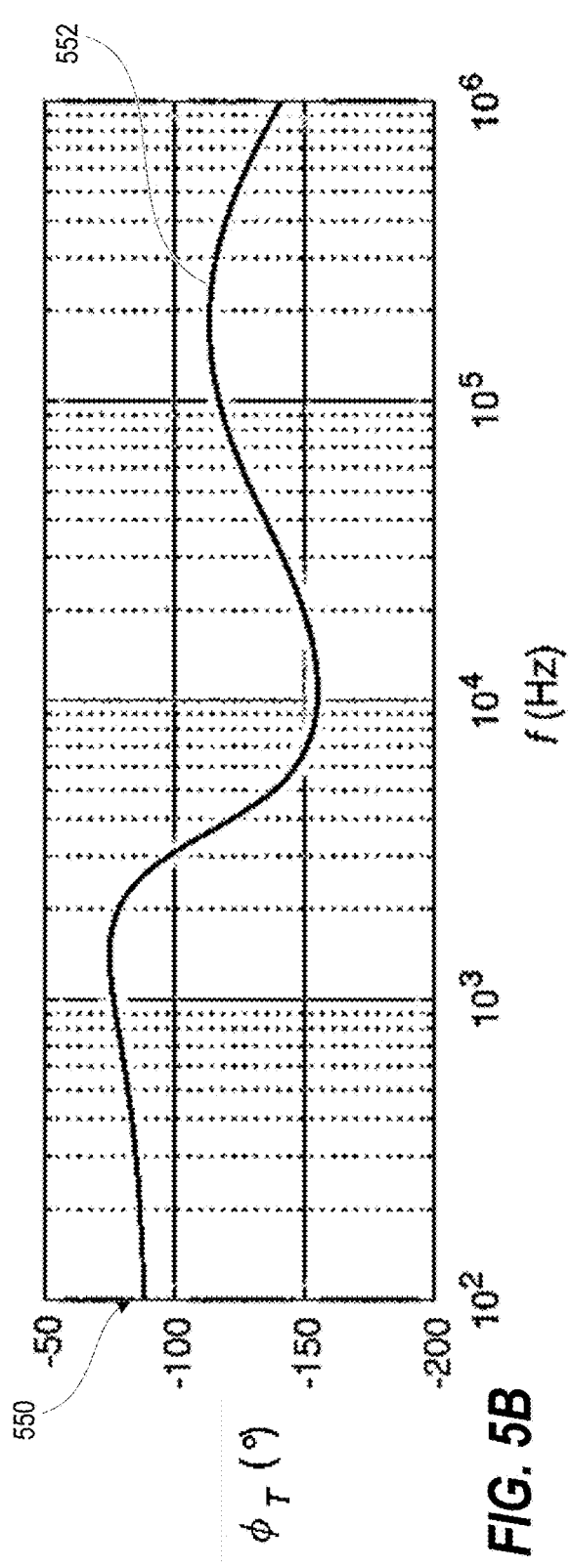
FIG. 5A
FIG. 5B

HIGH-BANDWIDTH ANALOG-CONTROLLED DC BREAKER ON DC/DC CONVERTER WITH GALVANIC ISOLATION

CROSS-REFERENCE TO RELATED APPLICATIONS

This application is a continuation-in-part of U.S. patent application Ser. No. entitled "High-Bandwidth Analog-Controlled DC Breaker On DC/DC Converter with Galvanic Isolation", filed 4 Dec. 2019, which in turn claims the benefit to U.S. Provisional Application Ser. No. 62/798,133 entitled "High-Bandwidth Analog-Controlled DC Breaker On DC/DC Converter with Galvanic Isolation", filed 29 Jan. 2019, the content of which is incorporated herein by reference in its entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to resettable electrical breakers.

2. Description of the Related Art

The state of the art for resettable breaking of DC fault current consists of slower mechanical contactors which provide galvanic isolation, or faster solid state devices which provide only electrical isolation. The latter technology also may utilize digital control, which adds a layer of latency and susceptibility to time-critical protective operations.

BRIEF SUMMARY

In one aspect, the present disclosure provides a method for galvanically isolating a load from a power source and limiting current from the power source to the load. The method includes receiving a direct current (DC) input voltage ("$v_{in}$") and an input current ("$i_{in}$") from a power source. The method includes switching one of a full-bridge inverter and a half-bridge inverter to synthesize a first alternating voltage waveform that magnetically couples through a transformer to induce a second alternating voltage waveform with galvanic isolation from the first alternating voltage waveform. The galvanic isolation provided by the transformer prevents a potentially-faulted load from having a direct electrical connection to the power source. The method includes rectifying the second alternating voltage waveform to produce a direct current (DC) output voltage ("$v_o$") having output current ("$i_o$") through more than one secondary side transistor. The method includes current limiting the more than one primary side drive transistor to reduce or prevent brown-out, black-out, or protective race conditions in non-faulted portions of DC power generation systems and DC distribution electrical power systems.

In a particular aspect of the present disclosure, the method further includes comparing the output current ("$i_o$") to a programmed current limit. The method includes, in response to the output current ("$i_o$") being greater than the programmed current limit, shutting off the more than one primary side drive transistor to limit output current ("$i_o$"). The method includes, in response to the output current ("$i_o$") not being greater than the programmed current limit, supplying a common collector voltage ("$v_{cc}$") to respective gate drives circuitry of the more than one primary side drive transistor.

In another aspect, the present disclosure provides a direct current-direct current (DC-DC) converter for galvanically isolating a load from a power source and limiting current from the power source to the load. The DC-DC converter includes one or a full-bridge inverter and a half-bridge inverter having an input portion that receives a direct current (DC) input voltage ("$v_{in}$") and an input current ("$i_{in}$") from a power source and having a power stage. The one of the full-bridge inverter and the half-bridge inverter feeds a transformer that galvanically isolates the input portion from the output. The DC-DC converter includes a controller having gate drives circuitry that switches the one of the full-bridge inverter and the half-bridge inverter to synthesize a first alternating voltage waveform that magnetically couples through the transformer to induce a second alternating voltage waveform with galvanic isolation from the first alternating voltage waveform, preventing potentially-faulted load from having a direct electrical connection to the power source. One or a full-bridge rectifier and a half-bridge rectifier has the power stage that rectifies the second alternating voltage waveform to produce a direct current (DC) output voltage ("$v_o$") having output current ("$i_o$") through more than one secondary side transistor. The DC-DC converter includes a current limiter that current limits the more than one primary side drive transistor to reduce or prevent brown-out, black-out, or protective race conditions in non-faulted portions of DC power generation systems and DC distribution electrical power systems.

In a particular aspect of the present disclosure, the current limiter of the DC-DC converter utilizes a transistor to control a voltage or a current mode control output signal to the gate drive circuitry. The current limiter compares the output current ("$i_o$") to a programmed current limit, once per cycle. The current limiter utilizes a unique implementation of negative gate bias to rapidly disable the gate drive signal, without modifying voltage or current mode control design or operation. The current limiter shuts off the more than one primary side drive transistor to limit output current ("$i_o$") in response to the output current ("$i_o$") being greater than the programmed current limit. The current limiter supplies a common collector voltage ("$v_{cc}$") to respective gates of the more than one primary side drive transistor in response to the output current ("$i_o$") not being greater than the programmed current limit.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 3A-B are graphical representations illustrating amplitude and phase respectively of a calculated frequency response for a Type II controller transfer function, according to one or more embodiments;

FIGS. 5A-B are graphical representations illustrating amplitude and phase respectively of calculated closed-loop system frequency response, according to one or more embodiments;

DETAILED DESCRIPTION

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1A:
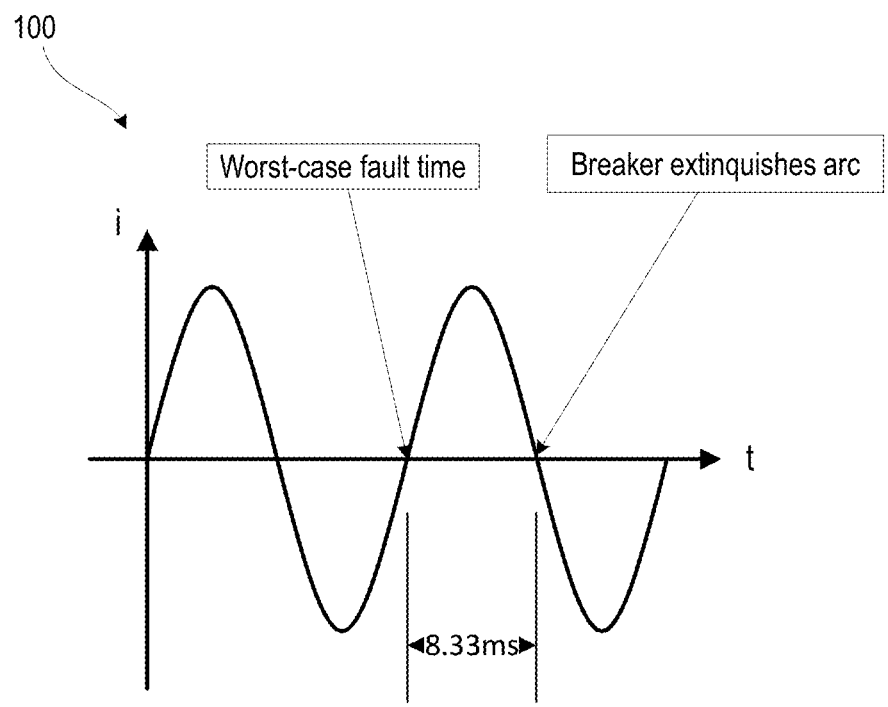
FIG. 1A is graphical plot illustrating a generally-known alternating current (AC) waveform on a 60 Hz system.

Power Stage & Breaking Mechanism: Standard AC breakers offer a natural breaking point at approximately zero current, where energy transfer is at a minimum. However, the standard AC breakers are thermally and/or magnetically actuated. FIG. 1A is graphical plot illustrating a generally-known AC waveform on a 60 Hz system. On a 60 Hz system, FIG. 1A is graphical plot 100 illustrating generally-known AC voltage on a 60 Hz system. Timing of zero crossings at 60 Hz is:

$$\frac{1}{2f_s} = 8.33 \text{ ms,}$$

which corresponds the duration of arcing before the standard breaker closes. Common aircraft AC power frequencies of 400 Hz will have a corresponding zero crossing maximum time of 1.25 ms. DC has no inherent operational zero-energy break point, so faults may be uncontrolled and very destructive.

Direct Current (DC) electrical system distribution lacks inherent capability to safely and effectively break fault current, particularly in power-dense platforms, where larger and slower electromechanical switching devices are not optimal or feasible. A low-energy, high-bandwidth breaking point is needed to minimize destructive let-through energy, while maintaining galvanic isolation between source and load, providing capability to protect the conductor and control the load.

Figure 1C:
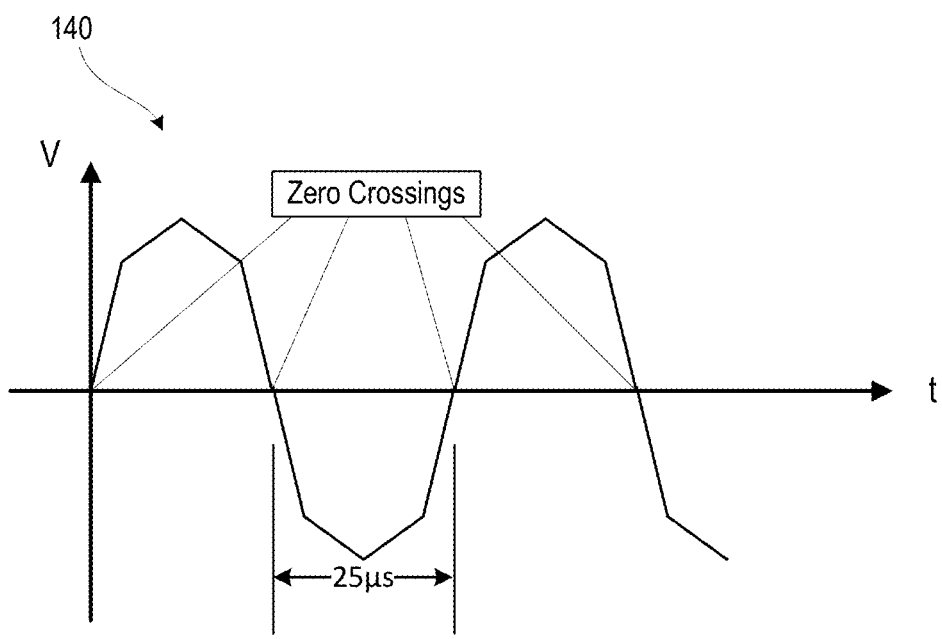
FIG. 1C is a graphical plot illustrating a simulated AC voltage waveform at 20 kHz that is used through a transformer of resettable DC breaker of FIG. 1B, according to one or more embodiments.
Figure 1B:
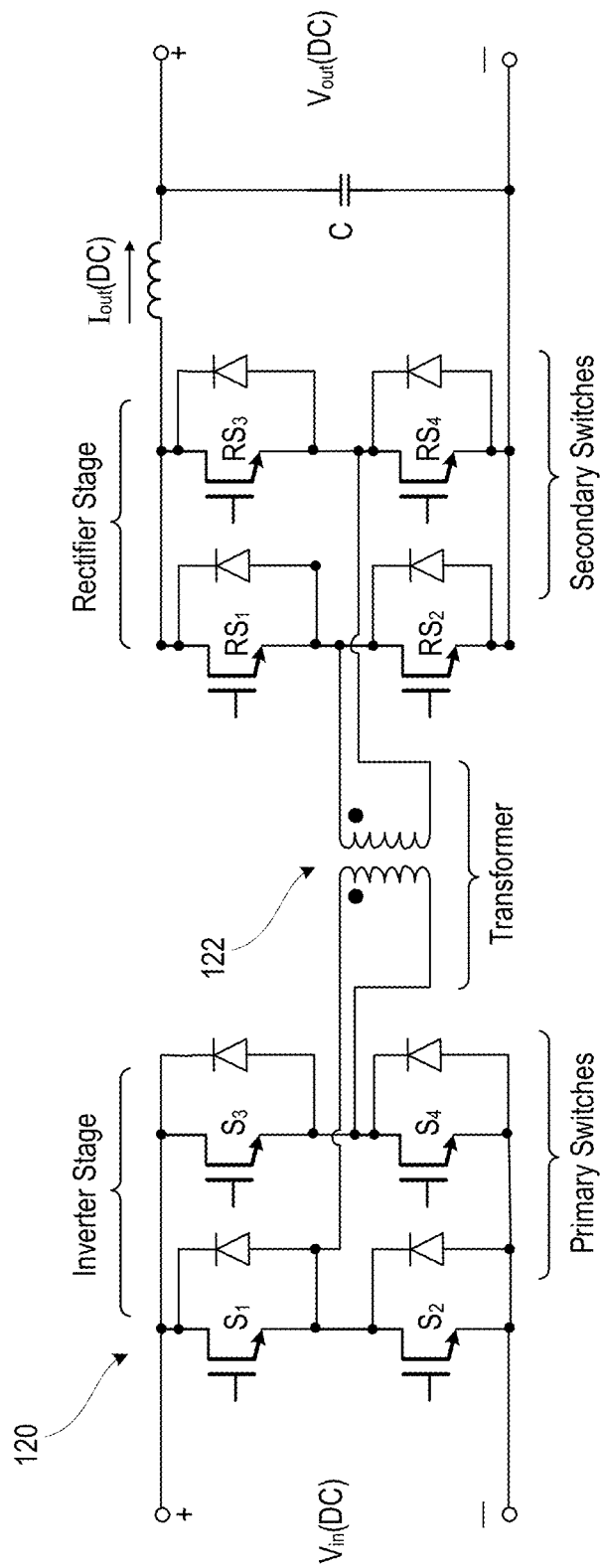
FIG. 1B is a circuit diagram illustrating a full-bridge direct current (DC) DC/DC converter that is implemented as a DC-AC-DC topology through a transformer, according to one or more embodiments.

The present innovation recognizes the advantage of having zero voltage breakpoints to control power faults without destructive arcing and provides a way to simulate this capability in DC-DC converters. FIG. 1B is a circuit diagram illustrating a full-bridge DC/DC converter 120 that is implemented as a DC-AC-DC topology through a transformer 122. Transformer 122 offers galvanic isolation between source and load as well as offering a zero crossing in a DC system as a natural breaking point. FIG. 1C is a graphical plot illustrating a simulated AC voltage 140 that is used through transformer 122 (FIG. 1B). If $f_s$=20 kHz, then fault conditions may be sustained for:

$$\frac{1}{2f_s} = 25 \text{ μs.}$$

Figure 1D:
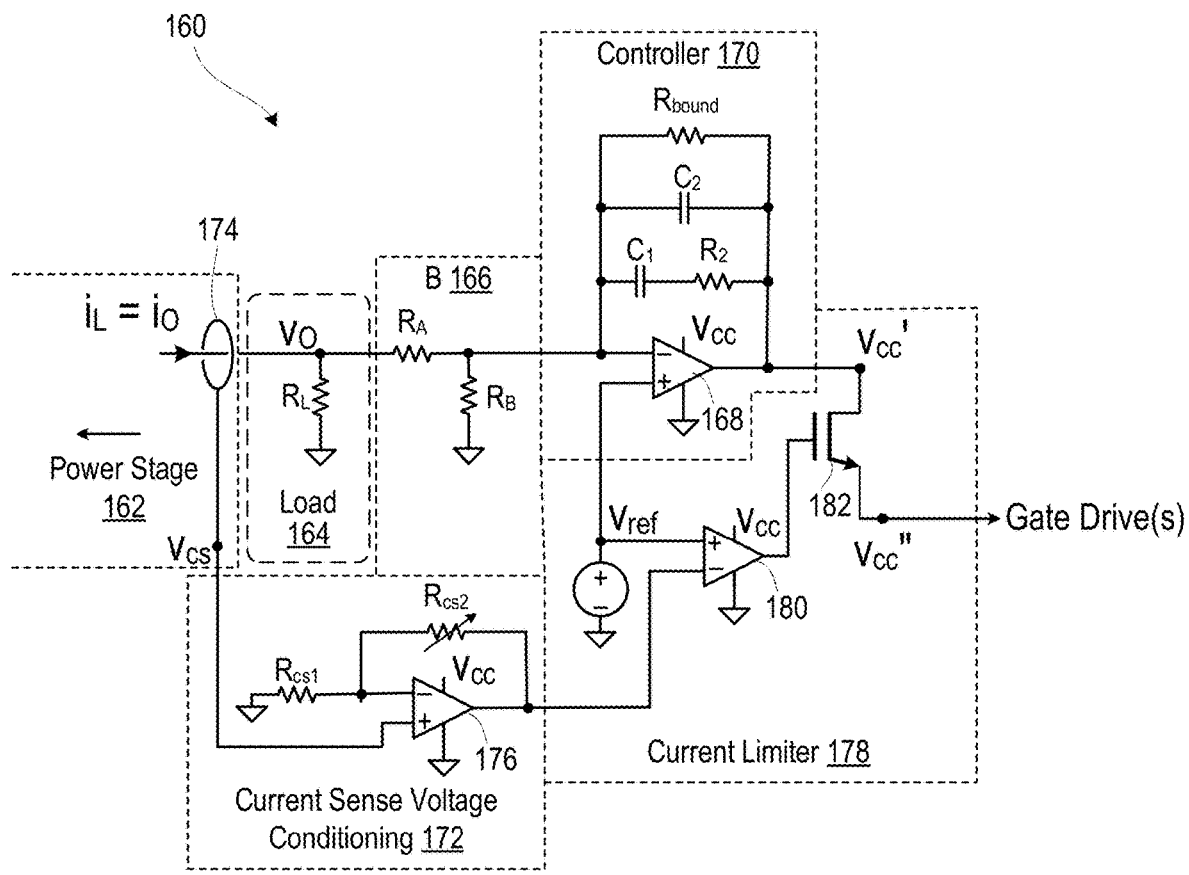
FIG. 1D is a control diagram illustrating operation of closed-loop control circuit with a novel current limiting circuit that causes full-bridge DC/DC converter of FIG. 1B to construct the simulated AC voltage of FIG. 1C, according to one or more embodiments.

FIG. 1D is a control diagram illustrating operation of closed-loop control circuit 160 that causes full-bridge DC/DC converter 120 (FIG. 1B) to create the simulated AC voltage 140 (FIG. 1C). Power stage 162 provides output current "$i_o$" and output voltage "$v_o$" to load 164, represented as resistive load "R" that passes $i_o$ to ground as load inductor current "$i_L$". Feedback B circuit 166 is a voltage divider of series resistor "$R_A$" and parallel resistor "$R_B$" that couple $v_o$ to negative input to a first operational amplifier 168 of controller 170. First operational amplifier 168 is powered by common collector voltage ($v_{cc}$). Control feedback is provided by: (i) bound resistor "$R_{bound}$"; (ii) serial combination of capacitor "$C_1$" and resistor "$R_2$"; and (iii) capacitor "$C_2$", each coupled across negative input and output ($V_{cc}'$) of the first operational amplifier 168. Positive terminal of first operational amplifier 168 is coupled reference voltage "$v_{ref}$".

Current sense voltage conditioning circuit 172 has a current sensor 174 that provides voltage reading of output current $i_o$ to positive terminal of second operational amplifier 176, for the purposes of signal amplification. Negative terminal of second operational amplifier 176 is coupled via first current sense resistor "$R_{cs1}$" to ground and coupled via second current sense variable resistor "$R_{cs1}$" to output of second operational amplifier 176. Second operational amplifier 176 is powered by $v_{cc}$. Current limiter circuit 178 receives output of second operational amplifier 176 at a negative terminal of third operational amplifier 180. Positive terminal of third operational amplifier 180 is coupled to $v_{ref}$. Third operational amplifier 180 is powered by $v_{cc}$. Output of third operational amplifier 180 is coupled to gate terminal of MOSFET 182 that receives output $v_{cc}'$ of first operational amplifier 168 of controller 170 at drain terminal. Source terminal of MOSFET 182 provides output $v_{cc}''$ to control gate drive(s). In the event of a current-limiting action, the output of operational amplifier 180 will drive to 0 $V_{dc}$, producing a negative gate voltage $v_{GS}$ on MOSFET 182, resulting in fast and abrupt turn-off of gate drives.

Figure 1E:
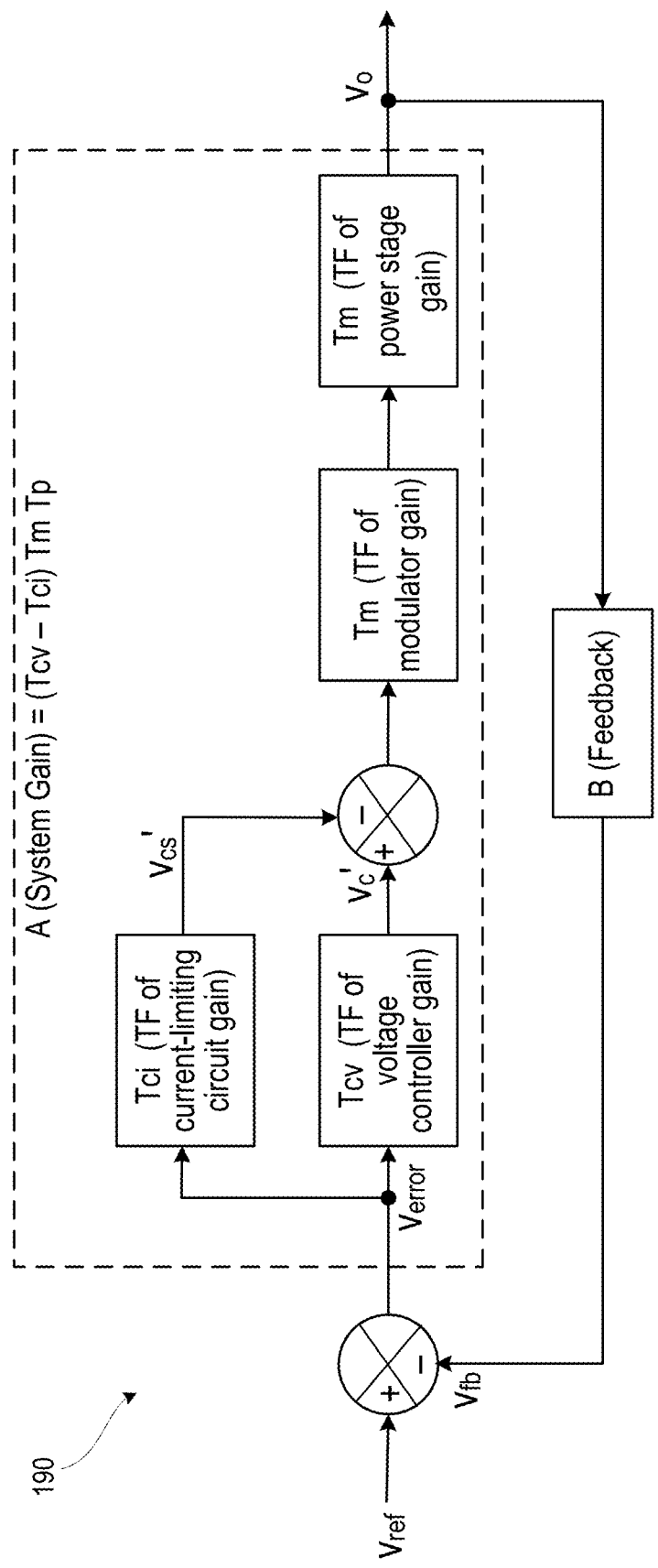
FIG. 1E is a block diagram of closed-loop transfer function of full-bridge DC/DC converter of FIG. 1B as regulated by closed-loop control circuit of FIG. 1D, according to one or more embodiments.

FIG. 1E is a block diagram of closed-loop transfer function 190 of full-bridge DC/DC converter 120 (FIG. 1B) as regulated by closed-loop control circuit 160 (FIG. 1D). Output voltage ($V_O$) is produced via closed-loop control of feedback "B" being subtracted from reference voltage "$V_{ref}$" to produce an error voltage "$V_{error}$" that receives system gain "A".

Systems gain A is determined as: $=(T_{cv}-T_{ci})T_mT_p$, where $T_{cv}$ is a typically designed voltage controller gain, $T_{ci}$ is current-limiting circuit gain, $T_m$ is modulator gain, $T_p$ is power stage gain, and "T" represents a transfer function.

DC/DC converter controllers are designed to program desired output voltage and/or current; but a novel loop is herein implemented to dynamically interrupt duty cycle, limiting output current, and therefore let-through energy, at a maximum programmed level, without affecting standard controller design. This allows for optimization of the controller without sacrificing current-limiting bandwidth.

The present innovation combines a hard current limit having high-bandwidth analog DC/DC or DC/AC control, with a galvanic isolation utilizing soft-switching through a transformer. This current limit capability can effectively be inserted between a controller and gate drives, without affecting controller design or operating parameters. Since the design is analog, this resettable DC breaker is capable of integrating within the hierarchy of analog or digital control systems.

The present innovation has potential uses in DC electrical power systems, where DC/DC conversion or DC/AC inversion are needed and dynamic instability or high-power, high-rate DC faults are a danger. Mobile electric transportation would benefit from this technology, including electric vehicles, more electric aircraft, and more electric ships. Furthermore, DC electric power distribution for data centers and cloud computing could also benefit. Finally, micro-grid installations and integration of renewable energy sources, including solar panels and battery storage, need responsive, resettable breaking capability to support loaded distribution networks.

The purpose of this resettable DC breaker is to simply program an output current limit of a DC/DC converter from a level which is higher than a desired operational current level without affecting design of the voltage-mode or current-mode controller or the normal operation of the converter.

Electrical power systems must provide current-limiting protection of connected conductors to prevent over-current of said conductor, which can potentially lead to destructive failure, proportional to the amount of energy provided to a fault. Not only will this method protect conductors, but the resettable DC breaker can be simply programmed to protect a wide array electrical loads through many operating conditions.

Furthermore, DC electrical distribution benefits from higher voltages to limit conductive losses. This necessitates DC/DC conversion near a load to the desired load voltage. It is optimal to combine the DC conversion function with the current-limiting function. Peak current mode control of the DC/DC converter may be implemented, providing current regulation per switching cycle, but this method is dependent on sampling, causing susceptibility to noise. Peak current mode control also requires a compensation slope to be inserted, which can lead to instability through transient events. It may be desired to implement average current mode control of the DC/DC converter with the disclosed continuous current limiting circuit, without losing the protective bandwidth afforded a peak current mode controller. This combination also applies to DC/AC inverters.

Classical, existing methods of breaking DC fault current include: fuses, relays, contactors, in-line linear regulation, and solid-state switching devices. Fuses are hard to size and cannot be reset. Relays and contactors can arc and bounce when breaking fault current, and can allow significant let-through energy due to the breaking time associated with mechanical coupling. Linear regulators with current limit are lossy devices and tend to be relatively large. Solid-state switching devices, such as MOSFETs, may reduce current by adjusting gate-to-source voltage, but lack galvanic isolation, making the switching devices and/or the electrical distribution system susceptible to over-voltage conditions. Designs utilizing metal oxide varistors (MOVs) are potentially cycle-limited, and may fail catastrophically, making MOV-based designs less attractive for critical applications in designs supporting the more-electric aircraft, or other safety-critical applications.

In a bridged configuration, this proposed novel current limiter provides galvanic separation of a potentially-faulted load from a source, limiting brown-out, black-out, or protective race conditions in the non-faulted portions of DC power generation systems and DC distribution electrical power systems. When implemented with soft-switched pulse-width-modulated (PWM) gate drives, the current limit may be activated in conjunction with a zero-crossing (of negligible voltage and negligible current), similar to the typical AC breaker on a near-unity power factor system, minimizing let-through energy on an isolated circuit, at up to the switching frequency. This DC breaker is entirely designed as an analog circuit to protect critical electrical conductors and/or loads without sacrificing bandwidth or allowing destructive let-through energy proportional to time associated with glitching, interrupting, or cyber-attack (the claims herein do not address additional protection against cyber attack).

Typical closed-loop DC/DC converters include voltage-mode or current-mode controllers to drive the output to design parameters. These are designed for stability in specific operational envelopes. This desired output level is set using a feedback network compared against a reference voltage, using an operational amplifier network. For current-mode control, a voltage loop and a current loop are present, and the current loop programs the desired maximum current. However, the current-mode controller does not necessarily allow for simple adjustment of the current limit during operation.

This DC/DC converter with current-limiting breaker functionality allows the designer to focus on the optimal control and stability parameters when designing the circuit, while ensuring cycle-by-cycle protection of the conductors and loads, as well as higher-level control of individual load current limits throughout a load profile. This is accomplished first by implementing a bridged DC/DC converter, using a transformer for electrical isolation. This design allows for the DC source or DC feeder to retain serviceable operation in the presence of a low impedance fault on the secondary side of the transformer. When designed in a bidirectional configuration, the inverse is also true. This is helpful to retain electrical power to a critical load, when two or more sources are available, even after one source is faulted.

For practical operation, soft-switching should be implemented with an inverter to reduce switching loss and provide a "zero crossing" to limit the amount of power transmitted through the transformer to the fault. Controller design may be optimized for intended operation, and voltage mode or current mode controller designs can be utilized. The current limit circuit is a comparator-based circuit designed independent of the controller. It reads a voltage proportional to the current reading, which is supplied from a shunt, a hall-effect sensor, or other current-to-voltage measurement method. The controller can operate as intended, while the current limit may activate.

During normal operation under the current limit, the current-limiting comparator supplies a $V_{CC}$ voltage output. This voltage directly drives a gate of an "intercept" MOSFET, where the drain is attached to the controller s output "control voltage." This $V_{CC}$ voltage should be sufficiently high, relative to the control voltage, such that the gate-source voltage requirement of this MOSFET is met to keep the switch in the linear region (e.g. $V_{CC}$=15V, Vc=5V). When the current limit is tripped, the comparator output is driven to zero volts, turning off the MOSFET quickly with negative gate bias and interrupting the control voltage. The gate drives then produce no output until the output current falls below the limit, at which time the current-limiting circuit releases the control voltage line. Even with an average current mode controller, where desired current is programmed, the delay of a few cycles of the average current increasing to this design limit may allow excessive let-through energy. This novel, yet simple current limiter actively limits this current at the switching frequency, while the average current mode controller "catches up."

For voltage mode controllers, this current-limiting circuit can be implemented without any alteration of the controller design, protecting the source from fault current. However, the result will be a depressed output voltage with a maximum current limit.

The maximum output power to which the switches will be subjected is simply the product of the nominal switch voltage stress and the maximum current limit. This maximum output power may then be a design parameter to protect the switching devices from failure.

Attaining galvanic isolation between load and source is accomplished through magnetic coupling of a transformer, requiring implementation of a compatible DC/DC converter topology, such as full-bridge or half-bridge. Higher switching frequencies accommodated by greater bandgap energy-capable devices, such as silicon carbide (SiC) metal-oxide-semiconductor field-effect transistors (MOSFETs), allow for reduced size and weight of this transformer, but may trade cycle life of output components. Careful consideration must be taken to converge on a design switching frequency. Fault let-through energy is a key design parameter here, along with size, weight, and component degradation.

The controller(s) may consist of typical first, second, or third order designs, and voltage-mode or current-mode may function properly with this innovation. These control circuits are typically operational amplifier-based. The current-limit control should utilize a comparator, which generally has higher switching bandwidth than a typical operational amplifier. The $V_{mail}$ voltage of the current-limiting comparator should be sufficiently high, relative to the control voltage, such that the gate-source voltage requirement of this MOSFET is met to keep the switch operating in the linear region.

Gate drives in pulse-width-modulated circuits also may utilize comparator(s), increasing responsiveness of gate-switching commands.

Gate drives may be commercial off-the-shelf devices.

Alternatives: The design presented utilizes a typical transformer core, but may be used in systems designed for inductive wireless power transfer, since the electrical architecture is similar.

The current limit control is intended to rapidly depress the control voltage produced by a voltage-mode controller or a current-mode controller. This momentarily stunts the control voltage which reaches the pulse-width-modulated gate drives, driving down the duty cycle. For voltage-mode control, the voltage translated through the control switches is lowered in response to a current exceeding the programmed level. In a current-mode controller, the current may be directly limited by adjusting duty cycle.

To reduce the number of reference voltages required for the overall design, the reference may be shared between the voltage-mode controller or current-mode controller and the current-limiting circuit, adjusting the high-bandwidth current limit by changing the current-sensing amplifier to set the current limit, rather than supplying a different reference voltage. This alteration to the design allows ability to adjust the current-limiting reference independent of the controller, using a potentiometer to alter the gain of the current reading. This also allows limited operation of certain loads in a larger system, when in a "load-shedding" mode of operation. Note that the current reading may be obtained through any method which converts current to voltage, such as using an inline differential shunt or a hall-effect sensor.

The current limiter utilizes a comparator with a voltage reference on the positive terminal. If desired, this polarity may be flipped, setting a minimal current. If a delay were implemented on the current-limiting circuit at startup, a minimal current might be programmed to keep a circuit from operating in discontinuous conduction mode (DCM).

Figure 2:
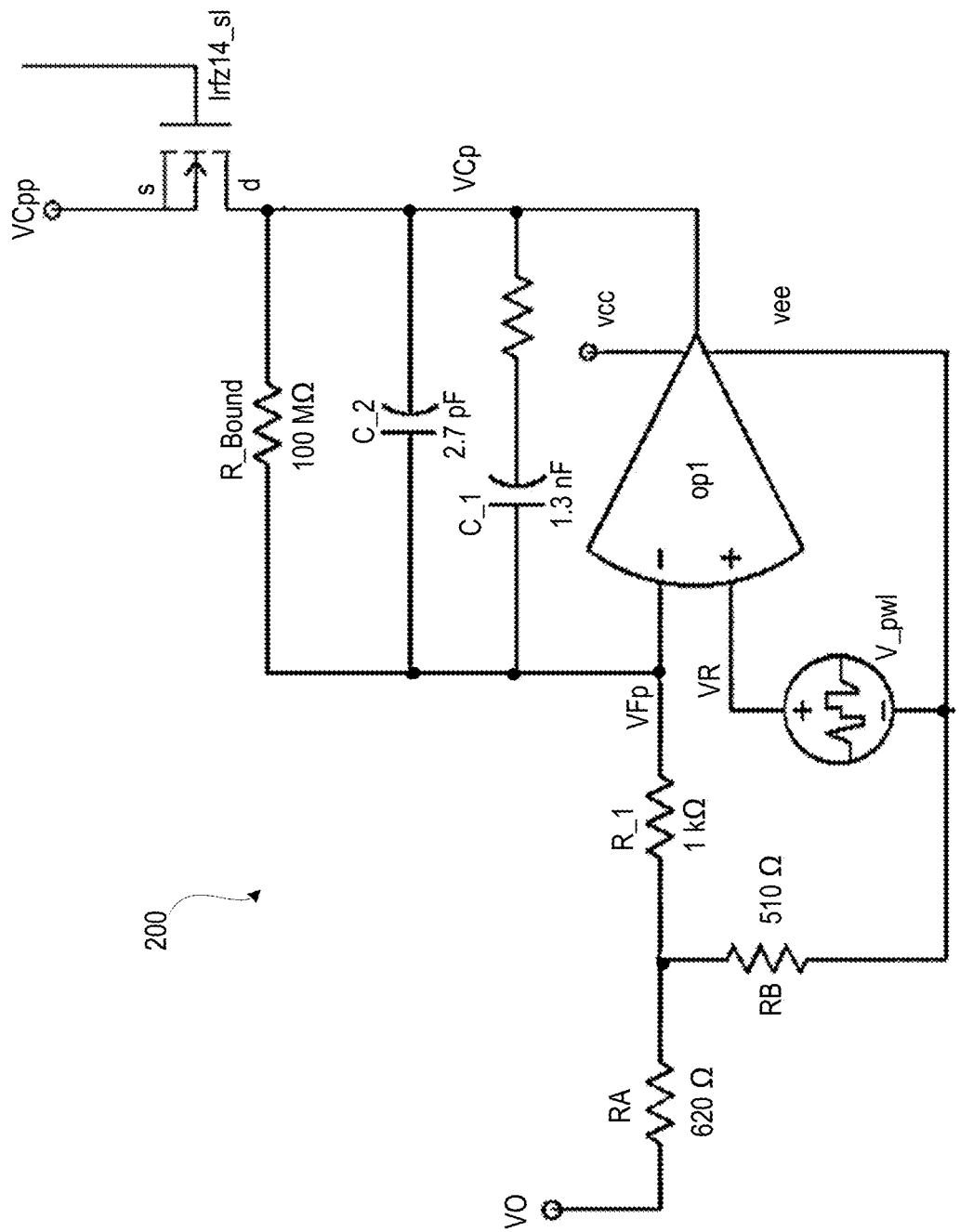
FIG. 2 is a circuit schematic presentation illustrating a Type II voltage-mode controller, according to one or more embodiments.

Voltage-Mode Controller Design: The following section is an example design process to showcase the current limit functionality on a legitimately-designed closed loop controller for a DC converter. According to aspects of the present disclosure, a current limiter is shown to have benefits over the generally-known voltage mode controller. It is desirable to control the converter with higher bandwidth, like a proportional controller provides, while increasing the DC gain, like an integral converter achieves. A proportional-integral converter combines these two controllers, but is not the best solution for rapid, stable control response with high DC gain and low error. FIG. 2 is a circuit schematic presentation illustrating a Type II voltage-mode controller. In an effort to increase the bandwidth of the control subsystem and to maintain high DC gain, a Type II controller 200, also known as a Single-Lead Integral Controller, is designed, as shown in FIG. 2. The output of controller is $V'_C$ and is sufficient to supply the modulator with a signal. In this implementation, this control voltage is gated through a current-limiting override, which will be discussed later.

As with many feedback control systems, this controller connects to the output voltage $V_O$ through a β-network. This network essentially forms a voltage divider through resistor $R_A$, referenced through resistor $R_B$. The feedback ratio β is calculated as 0.44. One of the resistors may be chosen, while the other must be calculated. In this case, let $$R_B = 510 \Omega \qquad \text{(Eqn. 1)}$$

The resistor $R_A$ is then solved as $$R_A = \frac{R_B}{\beta} - R_B = 638.47 \ \Omega \qquad \text{(Eqn. 2)}$$

Using standard resistor values, choose $R_A = 620\Omega$. The β-network may also be evaluated using h-parameters. Of interest, $$h_{11} = \frac{R_A R_B}{R_A + R_B} \qquad \text{(Eqn. 3)}$$

The controller is designed to compensate for $T_k$ with a large phase boost, as detailed in the following equations. This adds sizable crossover gain and a design phase margin P.M. to increase system responsiveness. Let phase margin be 45o. The phase boost is $$\phi_m = P.M. - 90° - \phi_{T_k}(f_c) = -45 - \phi_{T_k}(f_c) \qquad \text{(Eqn. 4)}$$

The maximum phase boost ratio may be defined as $$K = \sqrt{\frac{\omega_{pc}}{\omega_{zc}}} = \tan\left(\frac{\phi_m}{2}\right) + P.M. = \sqrt{1 + \frac{C_1}{C_2}} \qquad \text{(Eqn. 5)}$$

The integral portion of the Type II controller places a pole at the origin, through $C_2$, defined by $$B = \omega_c K |T_c(f_c)| = \frac{1}{C_2(R_1 + h_{11})} \qquad \text{(Eqn. 6)}$$

The other RC-pair forms a zero of frequency $$f_{zc} = \frac{1}{2\pi R_2 C_1} \quad \text{(Eqn. 7)}$$

Equation 6 can be rearranged to solve for the value of $C_2$, as $$C_2 = \frac{|T_k(f_c)|}{2\pi f_c K(R_1 + h_{11})} \quad \text{(Eqn. 8)}$$

From Equation 5, $C_1$ can now be found as $$C_1 = C_2(K^2 - 1) \quad \text{(Eqn. 9)}$$

Rearranging Equation 7 produces a value for $R_2$, such that $$R_2 = \frac{K}{2\pi f_c C_1} \quad \text{(Eqn. 10)}$$

To contain the DC gain of the operational amplifier, a bounding resistor is sometimes placed in parallel with other controller values. This can be determined with the amplifier equation applied at DC, $$R_{bound} = T_{c0}(R_1 + h_{11}) \quad \text{(Eqn. 11)}$$

where the specified bandwidth of the operational amplifier is $T_{c0}$.

The equations above were used with values specified in FIG. 2. FIGS. 3A-B are graphical representations illustrating amplitude and phase respectively of a calculated frequency response for a Type II controller transfer function. The response of the controller is shown in FIGS. 3A-B. Of note are the large phase margin over a wide frequency range, as well as the crossover frequency of the controller at approximately 45 MHz.

Figure 4:
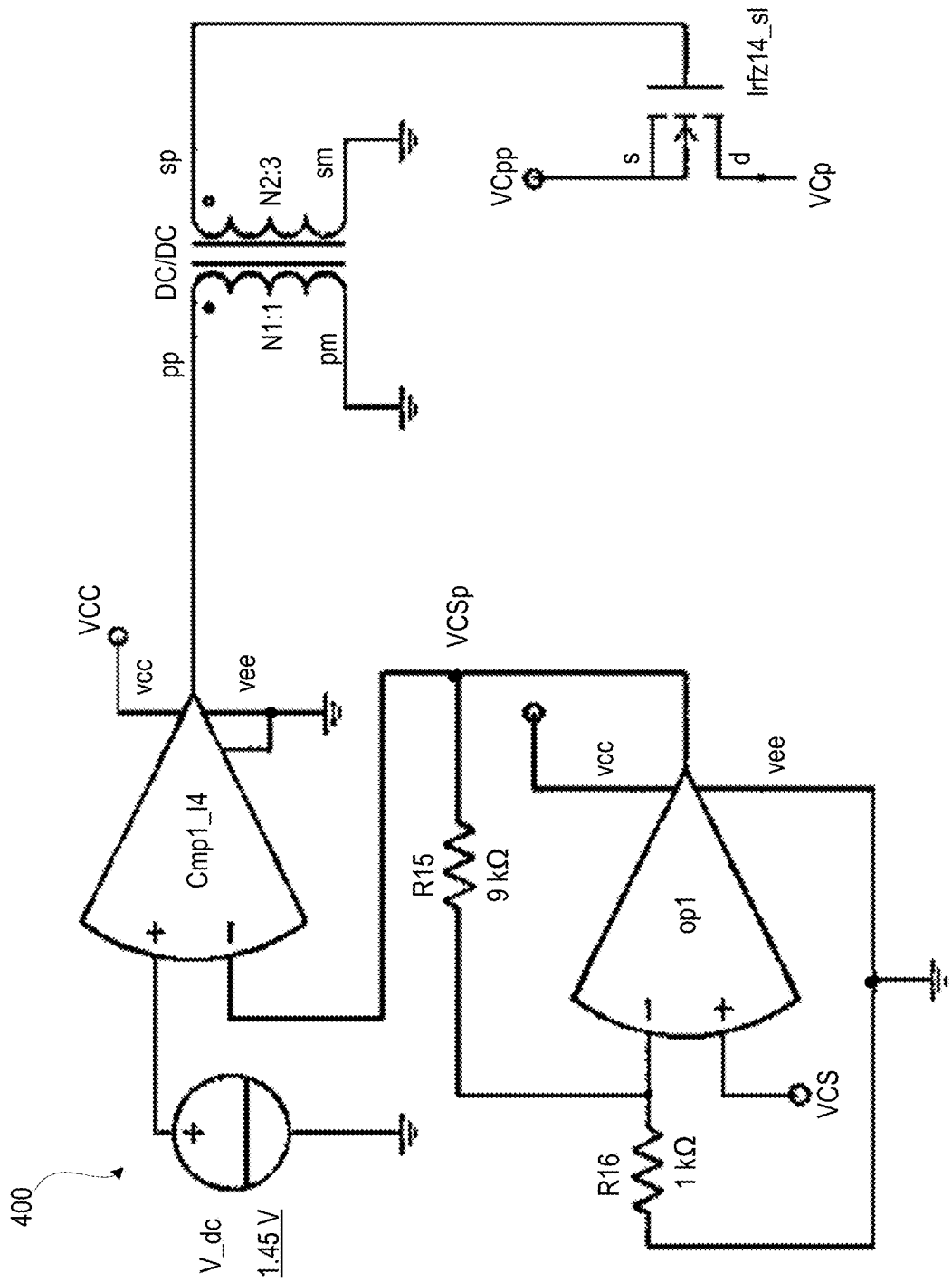
FIG. 4 is a circuit schematic presentation illustrating an active current-limiting circuit, according to one or more embodiments.
Figure 6A:
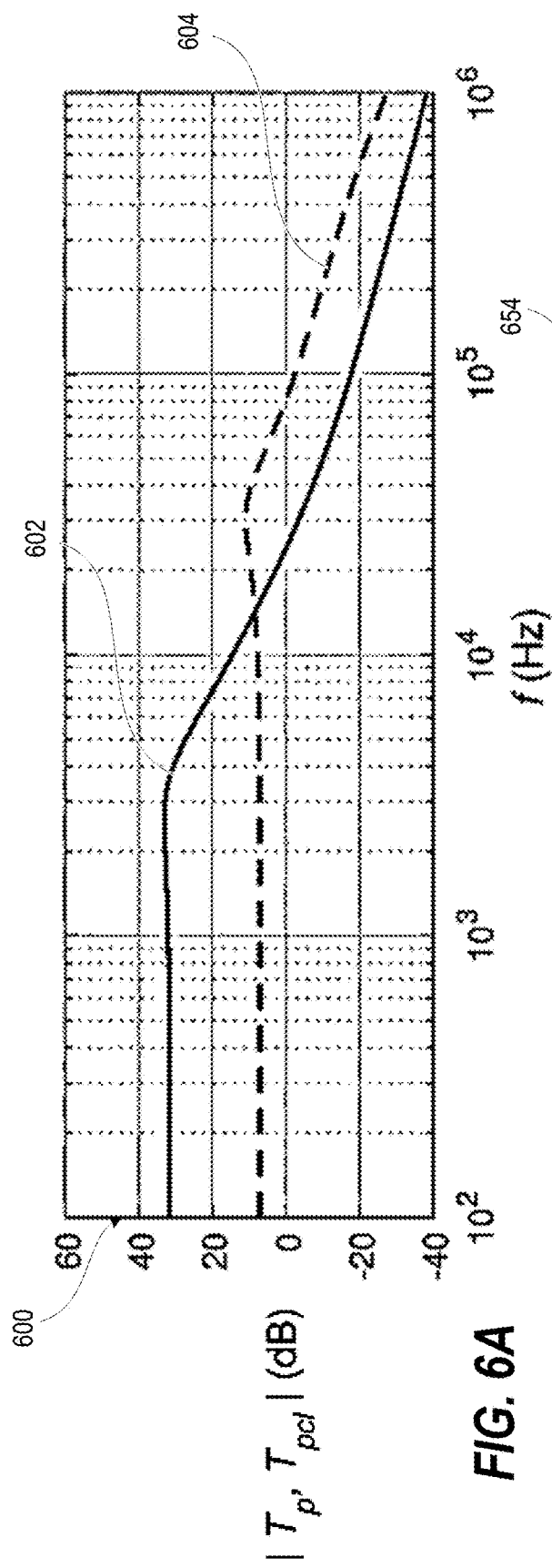
FIGS. 6A-B are graphical representations illustrating amplitude and phase respectively of calculated closed-loop control-to-output frequency response versus open-loop control-to-output frequency response, according to one or more embodiments.
Figure 6B:
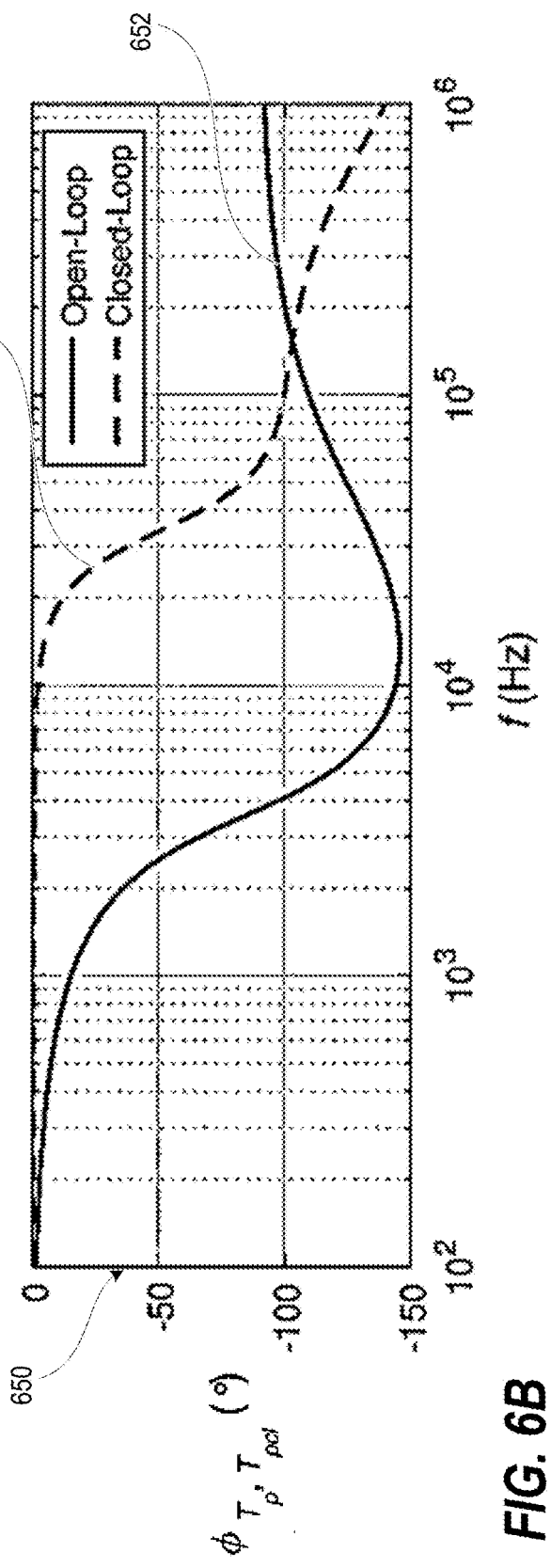
Figure 7A:
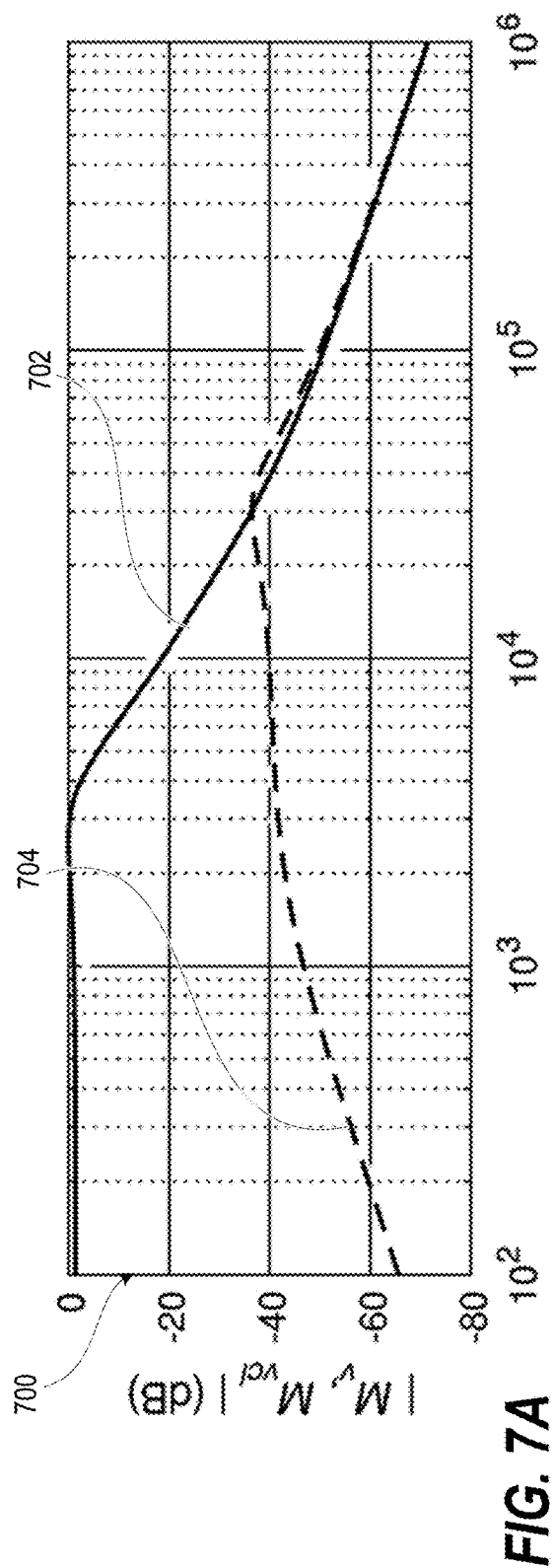
FIGS. 7A-B are graphical representations illustrating amplitude and phase respectively of calculated closed-loop input-to-output frequency response versus open-loop input-to-output frequency response, according to one or more embodiments.
Figure 7B:
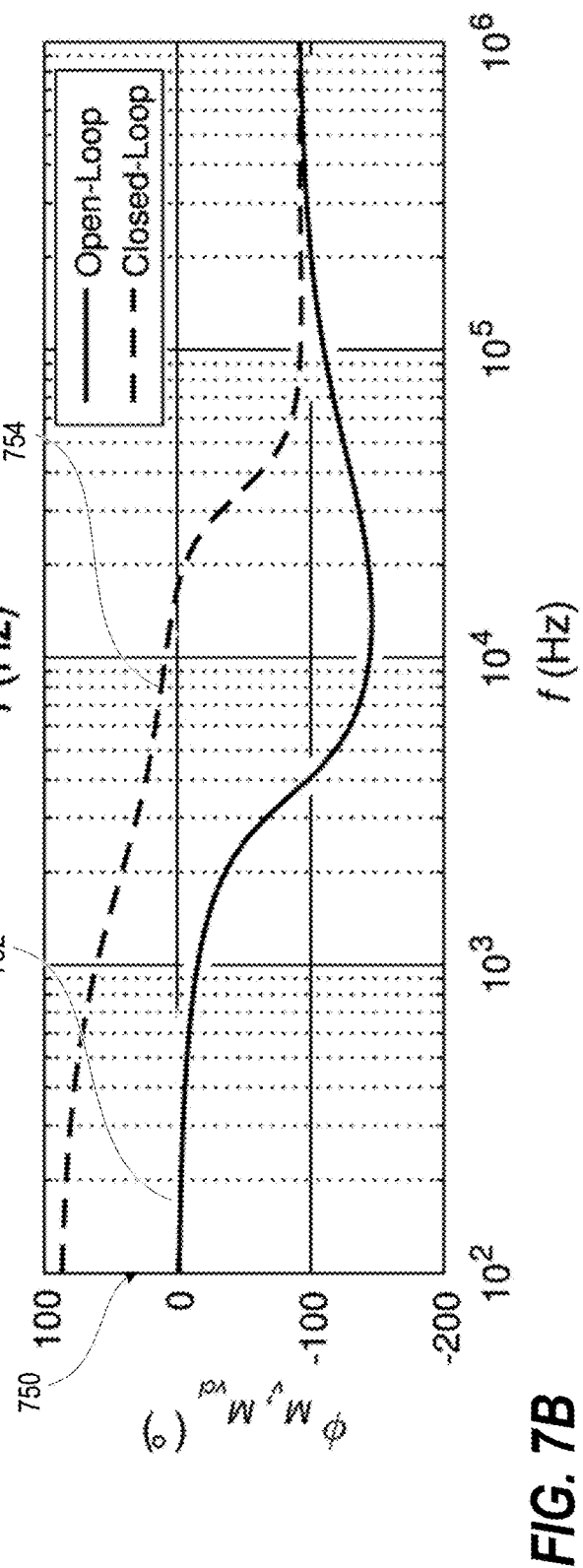
Figure 8A:
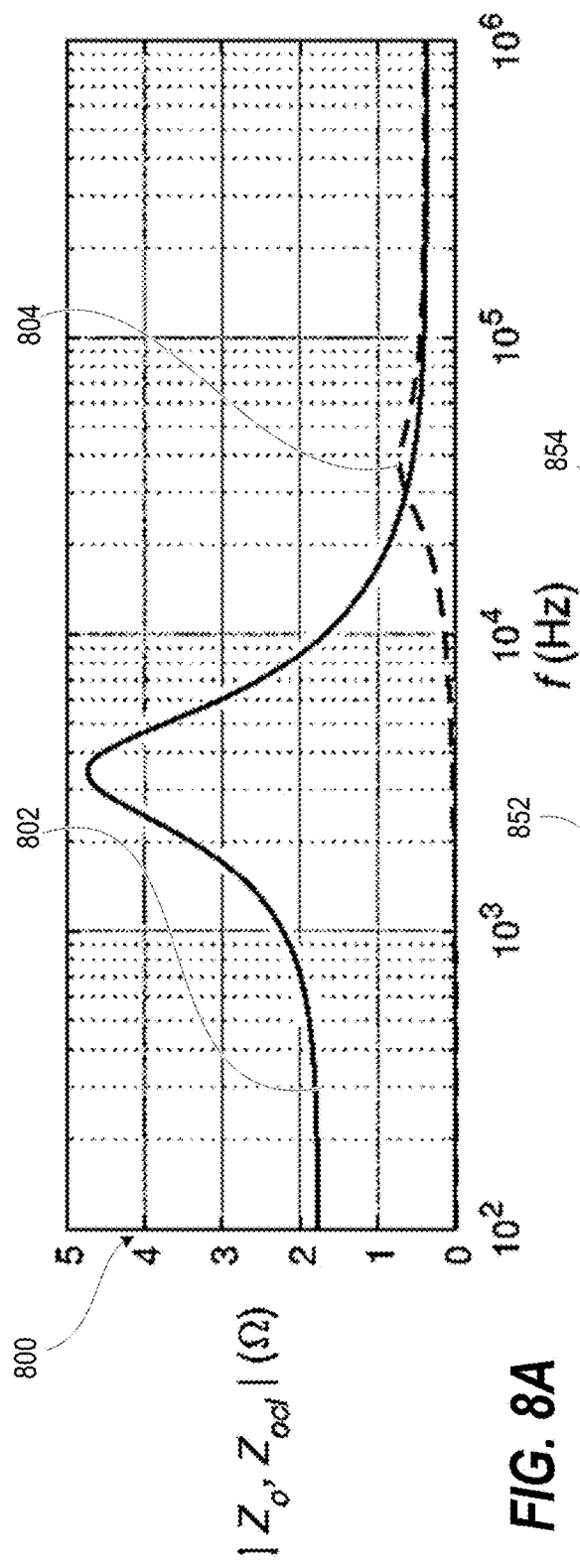
FIGS. 8A-B are graphical representations illustrating amplitude and phase respectively of calculated closed-loop output impedance frequency response versus open-loop output impedance frequency response, according to one or more embodiments.
Figure 8B:
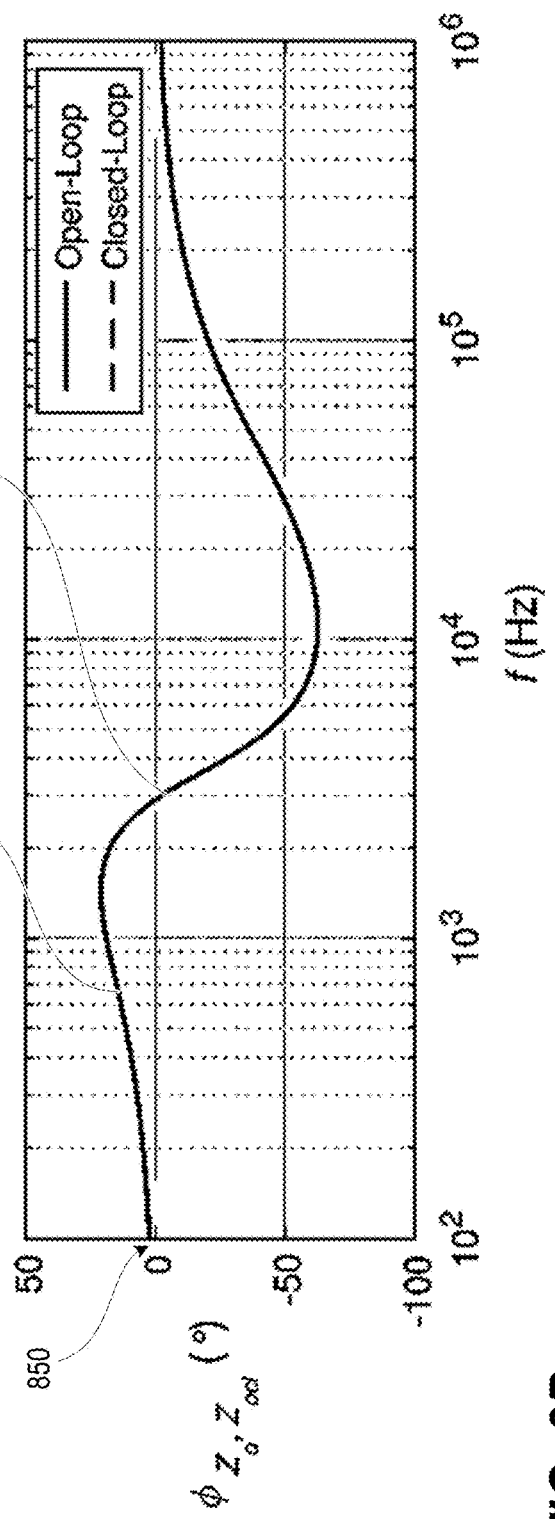

Current Limit: A key capability of this design remains the ability to isolate a faulted load from the source. This design limits the amount of let-through energy to a low-impedance load, which may include faults. The strategy employed is to actively limit the maximum allowable load current by interrupting the control voltage produced by the voltage-mode controller from the gate drives. This must occur very quickly, allowing an external system-level controller time to execute a follow-on decision. FIG. 4 is a circuit schematic presentation illustrating an active current-limiting circuit. The implemented active current-limiting circuit is given in FIG. 4. FIGS. 4, 5A-5B, 6A-6B, 7A-7B, and 8A-8B depict proper design of a voltage mode controller for a full-bridge DC converter, establishing that the current limiting circuit is not dependent on controller design and vice versa. FIGS. 5A-B are graphical representations illustrating amplitude and phase respectively of calculated closed-loop system frequency response. FIGS. 6A-B are graphical representations illustrating amplitude and phase respectively of calculated closed-loop control-to-output frequency response versus open-loop control-to-output frequency response. FIGS. 7A-B are graphical representations illustrating amplitude and phase respectively of calculated closed-loop input-to-output frequency response versus open-loop input-to-output frequency response. FIGS. 8A-B are graphical representations illustrating amplitude and phase respectively of calculated closed-loop output impedance frequency response versus open-loop output impedance frequency response.

The current limit is a comparator which relies on a steady voltage reference and a control voltage representing the inductor current reading. To limit the effect on the output current, a $0.1\Omega$ resistor is utilized to sense inductor current, which happens to be the same as the load current, for this and similar topologies. This current-sensed voltage ($V_{CS}$) is fed to a non-inverting amplifier of gain $$A_v = 10 \frac{V}{V},$$

to boost the output voltage to $V'_{CS}$, realizing a 1V/A representation. The reference voltage programs the maximum allowable current, allowing for a small current ripple. Given that a maximum design output current is 1.4 A, the current limit is set to 1.45 A. For a current below the limit, the comparator produces a 5V output. When the input voltage exceeds the current limit, the comparator output drops to zero.

SABER Circuit Simulator was used to verify this design. Since this software could not easily provide an option to change the comparator output voltage, a transformer with turns ratio n=3 is employed to boost the output voltage back to $V_{CC}$. As a side note, this method is employed through the simulated circuit wherever a comparator is used. This method would not be utilized in a hardware implementation.

The 15V output from the current-limiting circuit drives the gate of an IRFZ14 MOSFET. Since the control voltage $V_C$ should remain near the controller reference of approximately 2.6 V, a 15V input from the current limiting circuit will provide $V_{GS}$=12.4 V, easily operating the MOSFET as a switch. A zero voltage gate input from the current-limiting circuit will cause a negative voltage on $V_{GS}$, ensuring that the switch turns off rapidly, until the current-limiting comparator is again satisfied.

Implementation and Results of Full-Bridge DC/DC Converter in Simulation-Closed-Loop Response: When the loop is closed by the gate drives, the controller adjusts the uncompensated system response, giving it a design phase margin of 45°. This closed-loop system frequency response is shown in FIGS. 5A-B. The crossover frequency is indeed at $f_c$=40 kHz, and the phase margin is at 45°. In fact, the phase margin does not drop below 25°, out to 1 MHz.

Now that the loop is closed, the small-signal equations may be re-evaluated. The control-to-output closed-loop transfer function is $$T_{pcl} = \frac{T_p T_m T_c}{1 + T} \quad \text{(Eqn. 12)}$$

The response of $T_{pcl}$ is given in FIGS. 6A-B. It appears that the closed-loop control increases the bandwidth of the power stage with duty cycle D, but loses some low-frequency gain compared to the open loop response $T_p$. Phase margin has also increased for $T_{pcl}$.

The input-to-output closed-loop transfer function is $$M_{vcl} = \frac{M_v}{1 + T} \quad \text{(Eqn. 13)}$$

The response of $M_{vcl}$ is given in FIGS. 7A-B. The closed-loop control decreases the influence of an input voltage change affecting the output voltage regulation.

The output impedance closed-loop transfer function is $$Z_{ocl} = \frac{Z_o}{1+T} \quad \text{(Eqn. 14)}$$

The response of $Z_{ocl}$ is given in FIGS. 8A-B. The closed-loop control minimizes inductive loading and only has slight capacitive loading near and above the controller frequency fc=40 kHz.

Figure 9A:
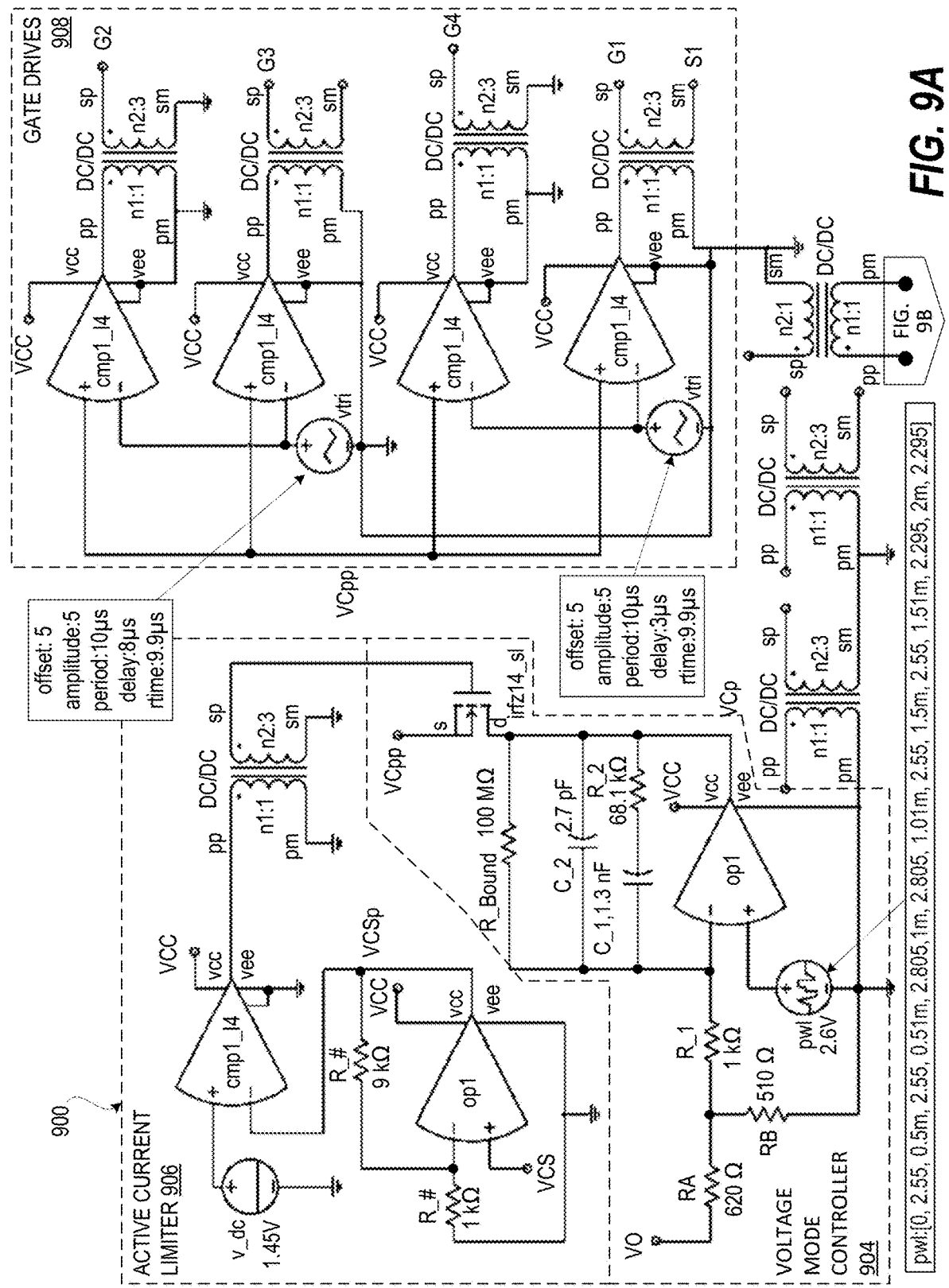
FIGS. 9A-B are a circuit schematic presentation illustrating a simulated full-bridge DC/DC converter design, according to one or more embodiments.
Figure 9B:
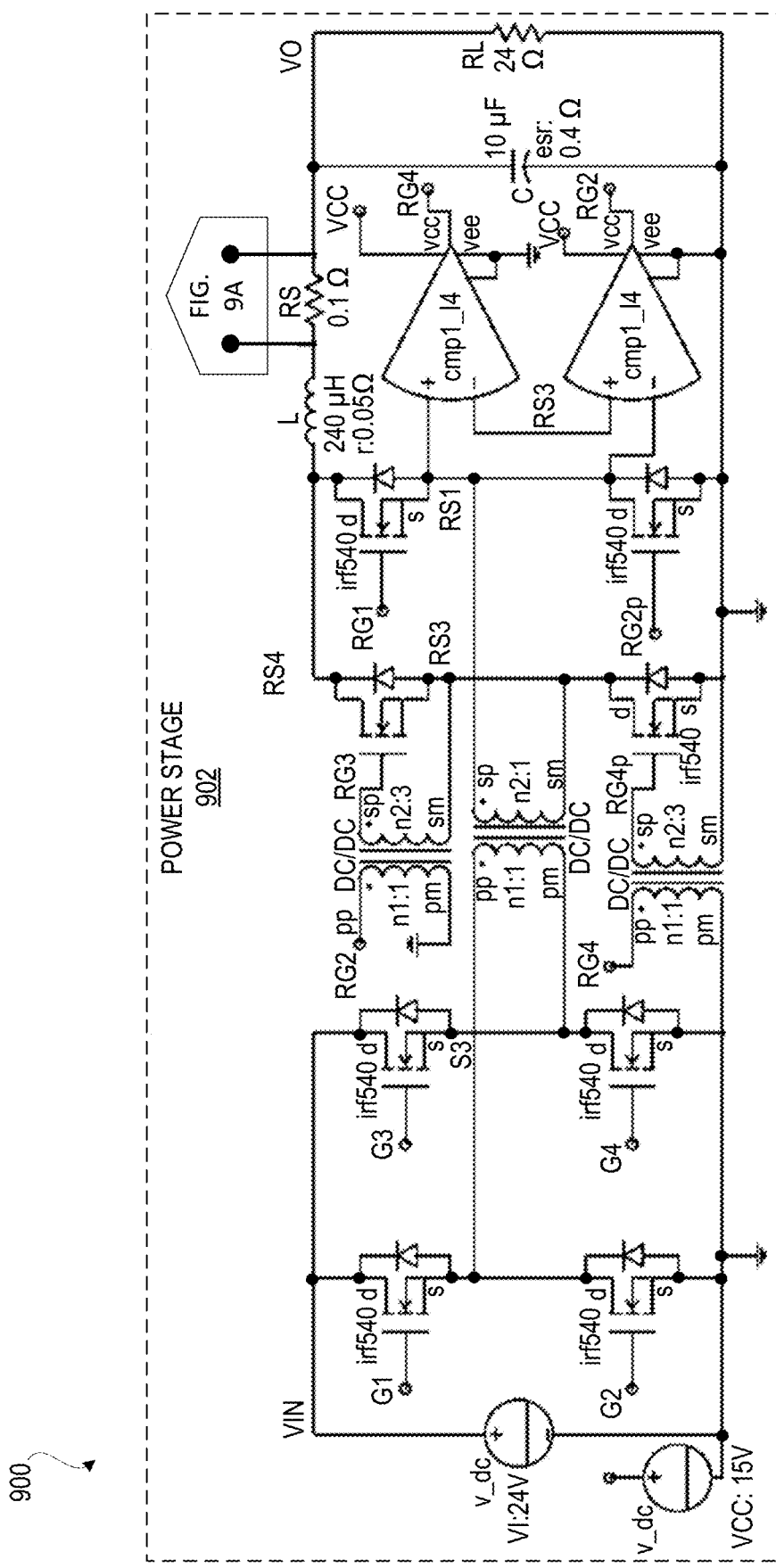

Full-Bridge DC/DC Converter Implementation: FIGS. 9A-B are a circuit schematic presentation illustrating a simulated full-bridge DC/DC converter design. Additional transformers shown, aside from the transformer linking the inverter and rectifier in FIG. 9B, are simply to accommodate the limitations of the simulation software. The complete circuit, including the power stage 902; voltage-mode controller 904; current limiter 906; gate drives 908; and self-driven synchronous rectifier 910 is shown in FIGS. 9A-B. The gate drives 908 and rectifier 910 will be discussed subsequently. Passive component values were selected from common available values nearest to the calculated value. In particular, resistors were chosen from available values for 1% tolerance.

There is a limitation related to the full circuit simulations. Due to the volume of calculations, the simulator tends to create output files larger than available server storage. Therefore, limitations of approximately 2 ms per simulation are imposed. This makes it difficult to allow for full settling of the output, especially for the unit-step simulations.

Gate Drives: The gate drives 908 are in the upper right portion of the circuit in FIG. 9A. As previously mentioned, the current-limited controller output signal $V''_C$ is compared against the $V_{Tm}$=10V sawtooth signal at $f_s$=100 kHz, equivalent to a period of 10 µs.

For reference, the voltage is programmed in SABER circuit simulator as having an offset of 5V and a peak amplitude of 5 V. The simulator malfunctions if the rise time is equal to the period, so the rise time was set to 9.9 µs. This does not appear to affect the gate drive function.

There are four comparators, although technically the non-ZVS (zero voltage switching) converter only requires two comparators, which an isolated source reference for each switch. The lower switches are ground-referenced, but the upper switches must be source-referenced, to provide the proper differential for $V_{GS}$.

The switch pairs $S_A$ (including switches S1 and S4) and $S_B$ (including switches $S_2$ and $S_3$), must be separated by half the period, or 5 µs. Due to simulation anomalies related to current-limiting during a high gate drive output, the delays were shifted by 3 µs. This results in intended operation.

For ZVS switching, the gate drives within $S_A$, for instance, will have additional latency between $S_1$ and $S_4$ equivalent to the time constant created by the interaction between the switch output capacitance and the transformer leakage inductance.

Self-Driven Synchronous Rectifier: Since the design output voltage is 12V at relatively lower power output, the diode losses derived earlier, due to voltage loss, are too high. To reduce losses without adding much control complexity to this project, self-driven synchronous rectification is utilized. The switching is directly regulated by the polarity of the transformer secondary terminals. When the polarity is positive, the rectifier duty cycle $D_{RA}$ is driven high. Conversely, when the polarity is negative, the duty cycle $D_{RB}$ is driven high. When the secondary voltage collapses, the body diodes of the MOSFETs conduct, maintaining continuous conduction of the inductor L. By association then, the self-driven synchronous control is partially driven indirectly by the primary-side gate drives. However, no additional signal is required from the primary-side gate drives for this synchronous rectifier to function the same as a diode rectifier.

The anti-parallel diodes included with all switches are ideal diodes. The power MOSFETs chosen are IRF540, since the losses must be realistic enough to converge on a somewhat accurate efficiency to estimate a proper duty cycle. Since simplifying design assumptions were made to utilize an ideal transformer and non-ZVS operation, the ideal diodes are meant to suppress ringing, due to hard-switching. A more mature design might incorporate either ZVS-driven or non-ZVS-driven dead-time, along with a fast-recovery anti-parallel diode, such as a Schottky or SiC diode.

Dynamic Response of the Closed-Loop Output Voltage: The dynamic response of the output voltage provides another measure of controller adequacy. Each output of the small-signal transfer functions were given an input step function to determine the predicted steady-state response of the output, both without the closed loop and with the closed loop. Unit-step response here refers to 10% step in duty cycle for $T_p$ and $T_{pcl}$; a 1V step of input voltage for $M_v$ and $M_{vcl}$; and a step in load current of 1 A for $Z_o$ and $Z_{ocl}$.

Figure 10:
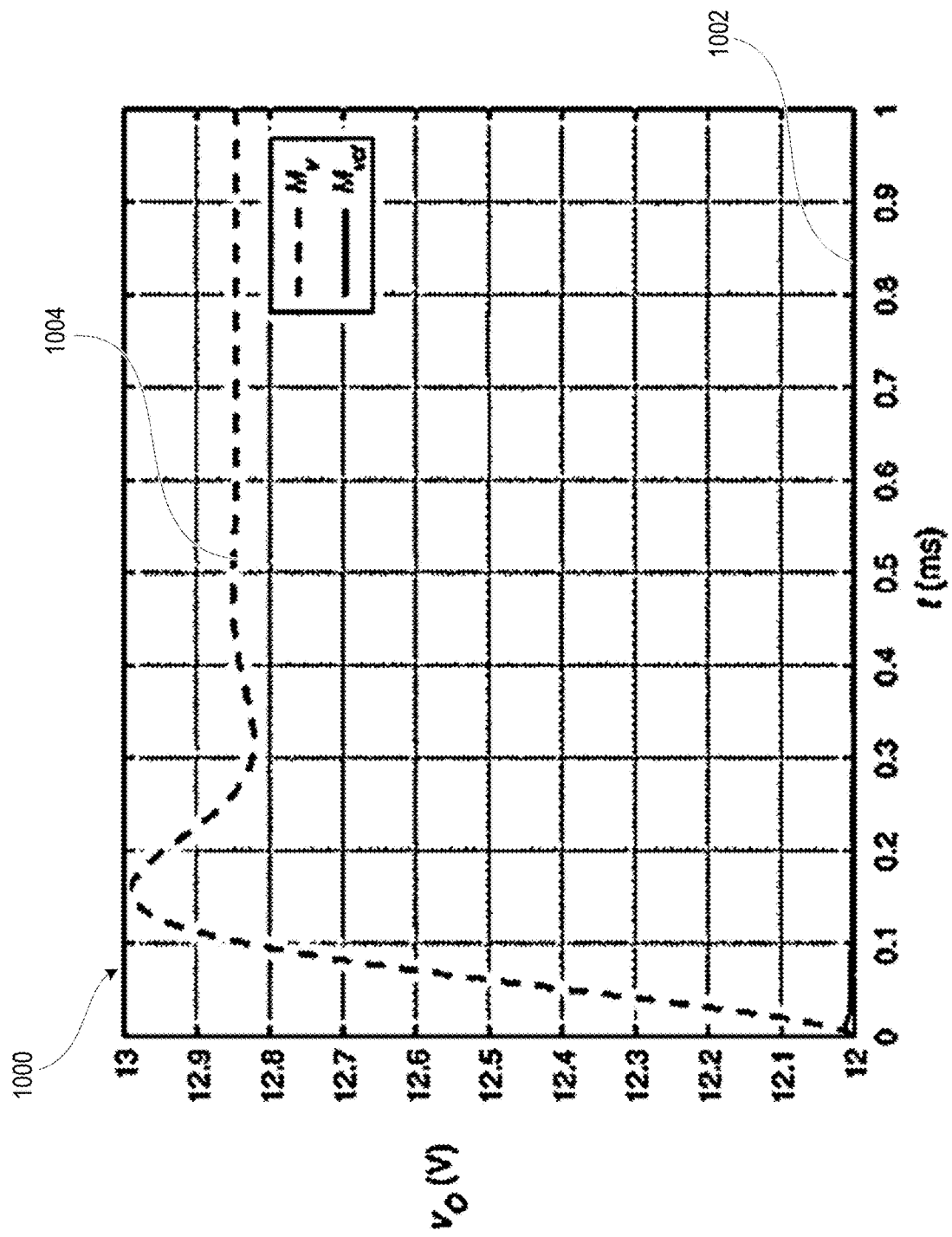
FIG. 10 is a graphical representation illustrating a calculated closed-loop input-to-output step response versus open-loop input-to-output step response, according to one or more embodiments.

Open-loop and closed-loop audio susceptibility are calculated and compared in FIG. 10. The open-loop unit-step response causes a calculated steady-state output of approximately 12.85V, while the closed-loop output is relatively unchanged, as designed.

Figure 11A:
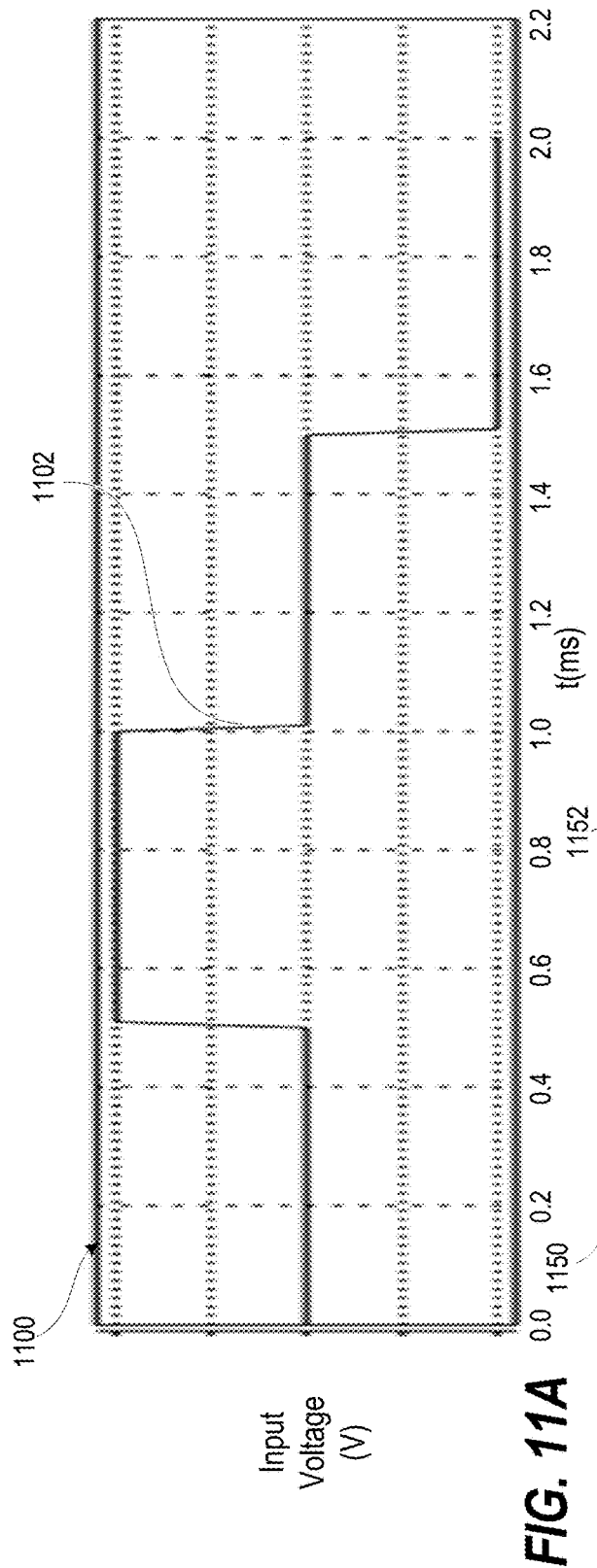
FIGS. 11A-B are graphical representations of input and output voltage respectively illustrating simulated closed-loop audio susceptibility step response, according to one or more embodiments.
Figure 11B:
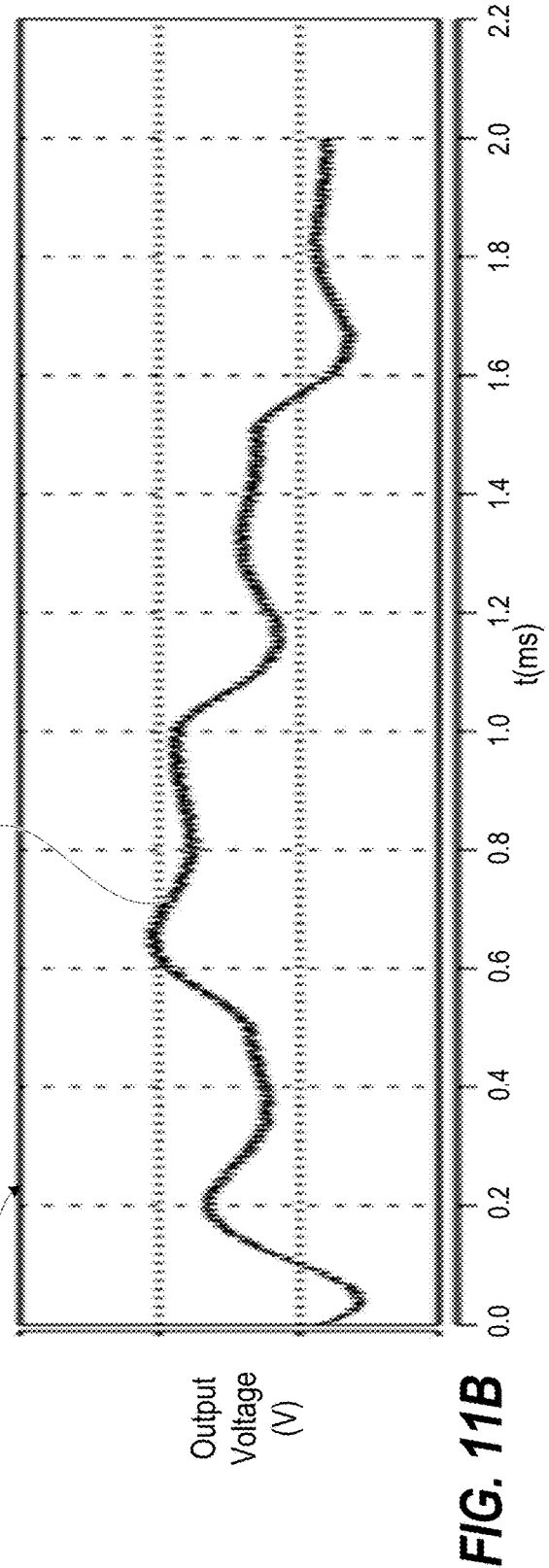

The closed-loop audio susceptibility is then tested with a positive and negative step function on the input within the complete full-bridge converter circuit 900 from FIGS. 9A-B. These results are then seen in FIGS. 11A-B. Here, the closed-loop output is estimated to have a shift by 0.5V with a unity change of input. These discrepancies may be due to the aforementioned implementation of the IRF540 model with an ideal transformer and ideal diodes.

Figure 12:
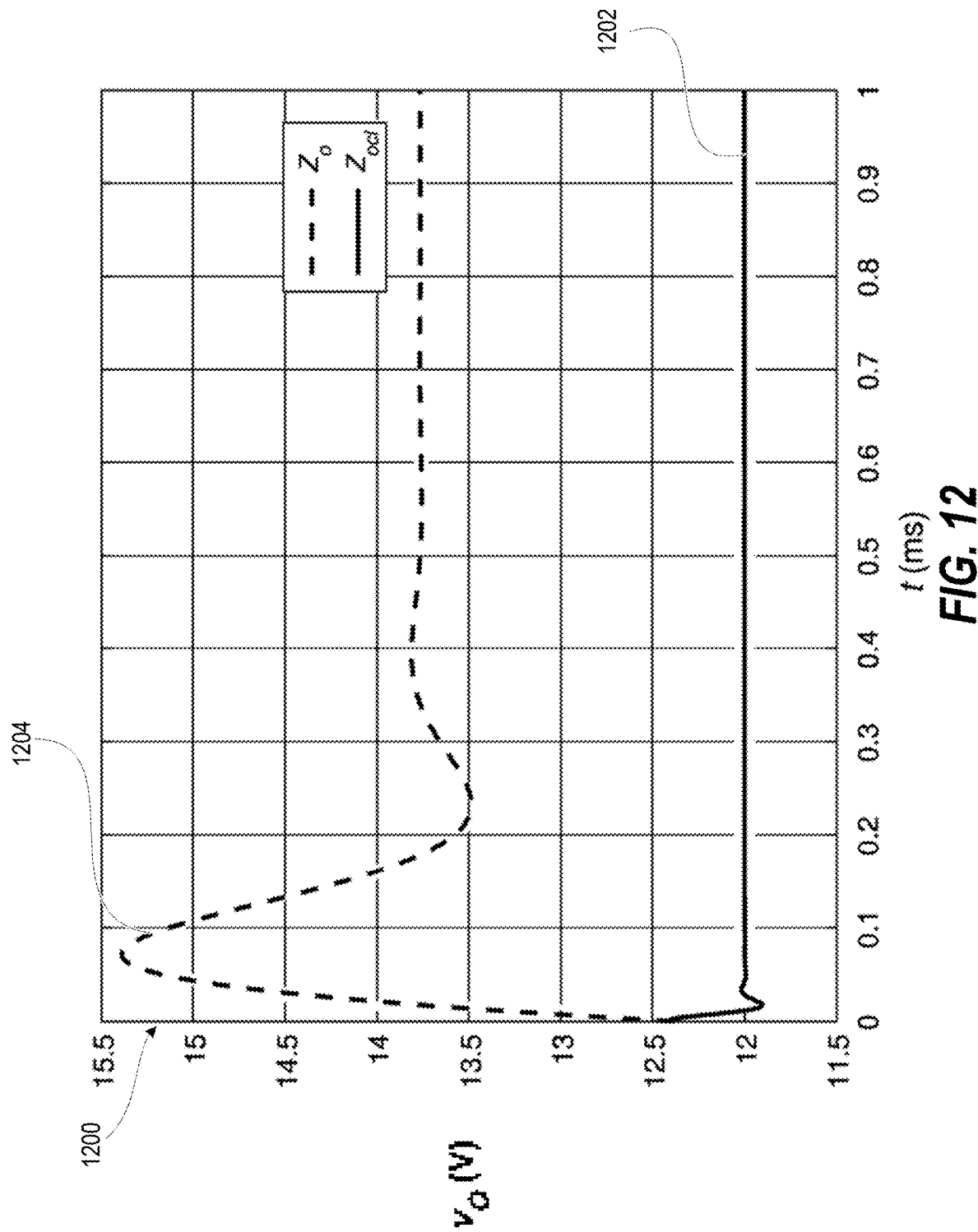
FIG. 12 is a graphical representation illustrating calculated closed-loop output impedance step response versus open-loop output impedance step response, according to one or more embodiments.

FIG. 12 is a graphical representation illustrating calculated closed-loop output impedance step response versus open-loop output impedance step response. Open-loop and closed-loop output impedance are calculated and compared in FIG. 12. The open-loop unit-step response causes a calculated steady-state output of approximately 13.75 V, while the steady-state closed-loop output also remains relatively unchanged, as designed.

The closed-loop output impedance is then tested with a negative step function on the input within the complete converter circuit 900 from FIGS. 9A-B. This was done by initializing the converter with a 0.4 A load, then raising the load to 1.4 A, by adjusting the corresponding load resistance. These results are then seen in FIGS. 12A-B. The closed-loop output is estimated to shift by 0.3 V with unity change of load current.

Figure 13A:
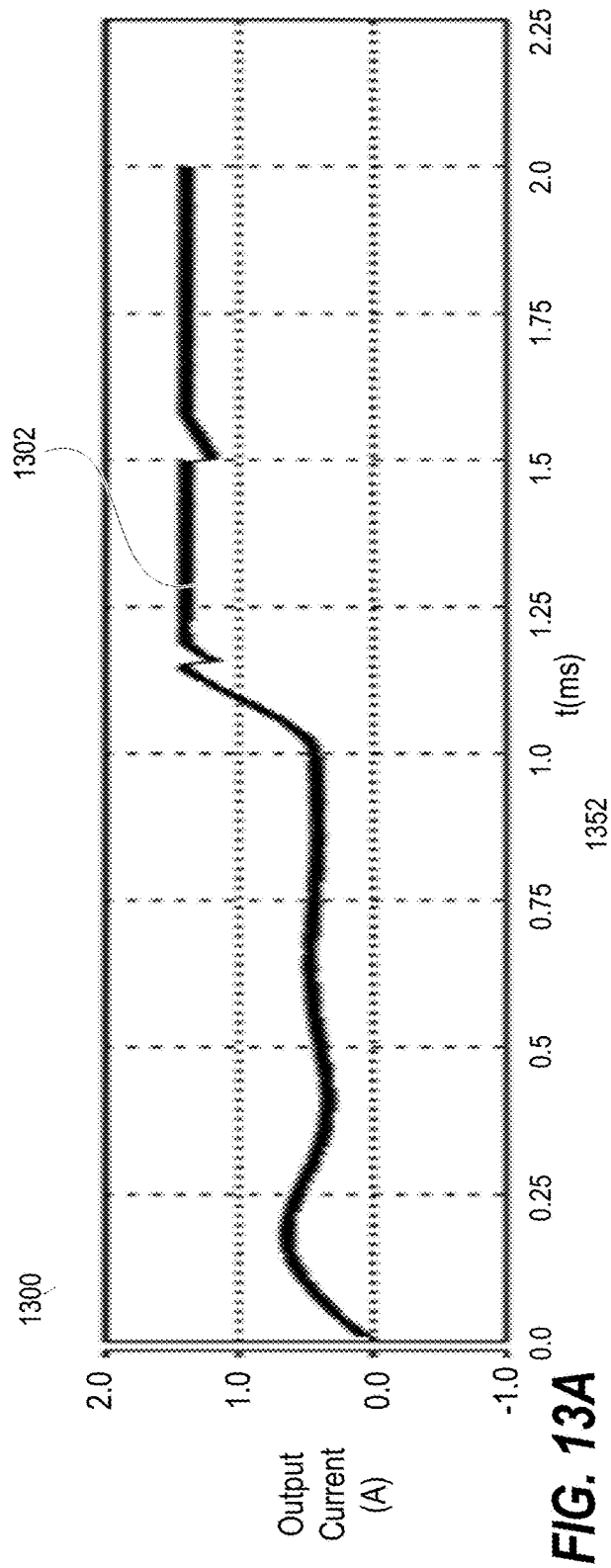
FIGS. 13A-B are graphical representations illustrating simulated closed-loop output impedance step response, according to one or more embodiments.
Figure 13B:
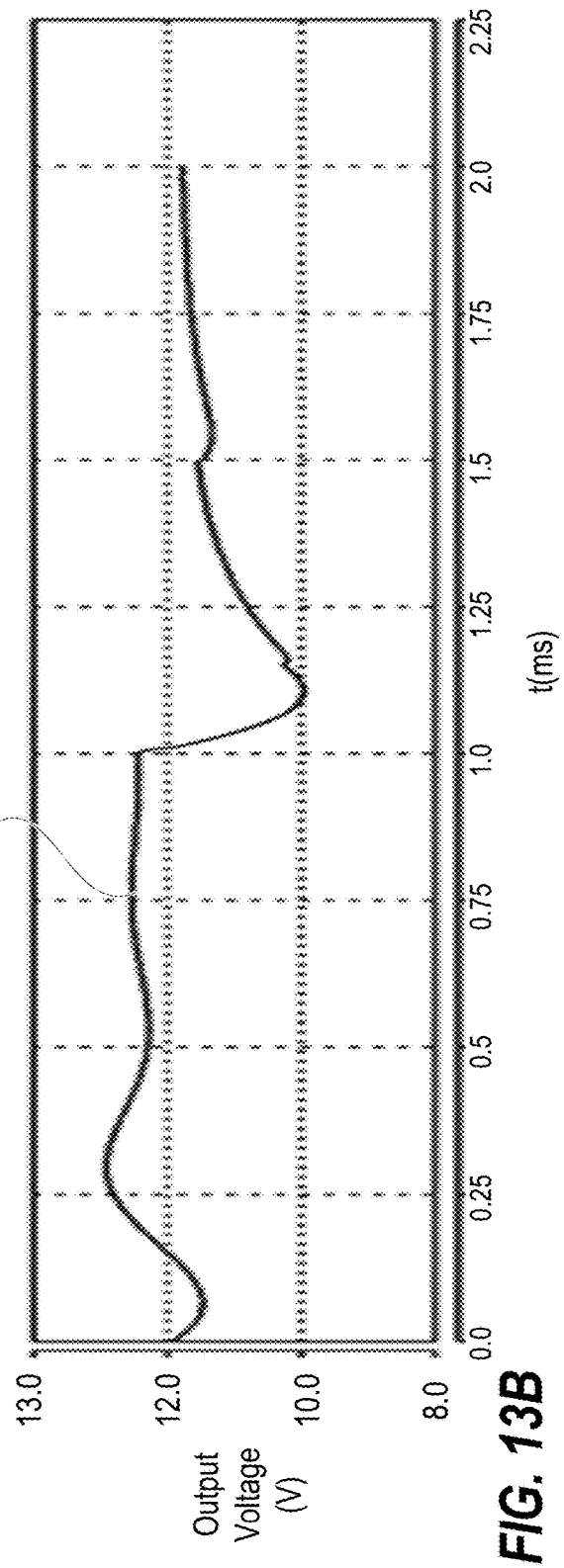
Figure 14:
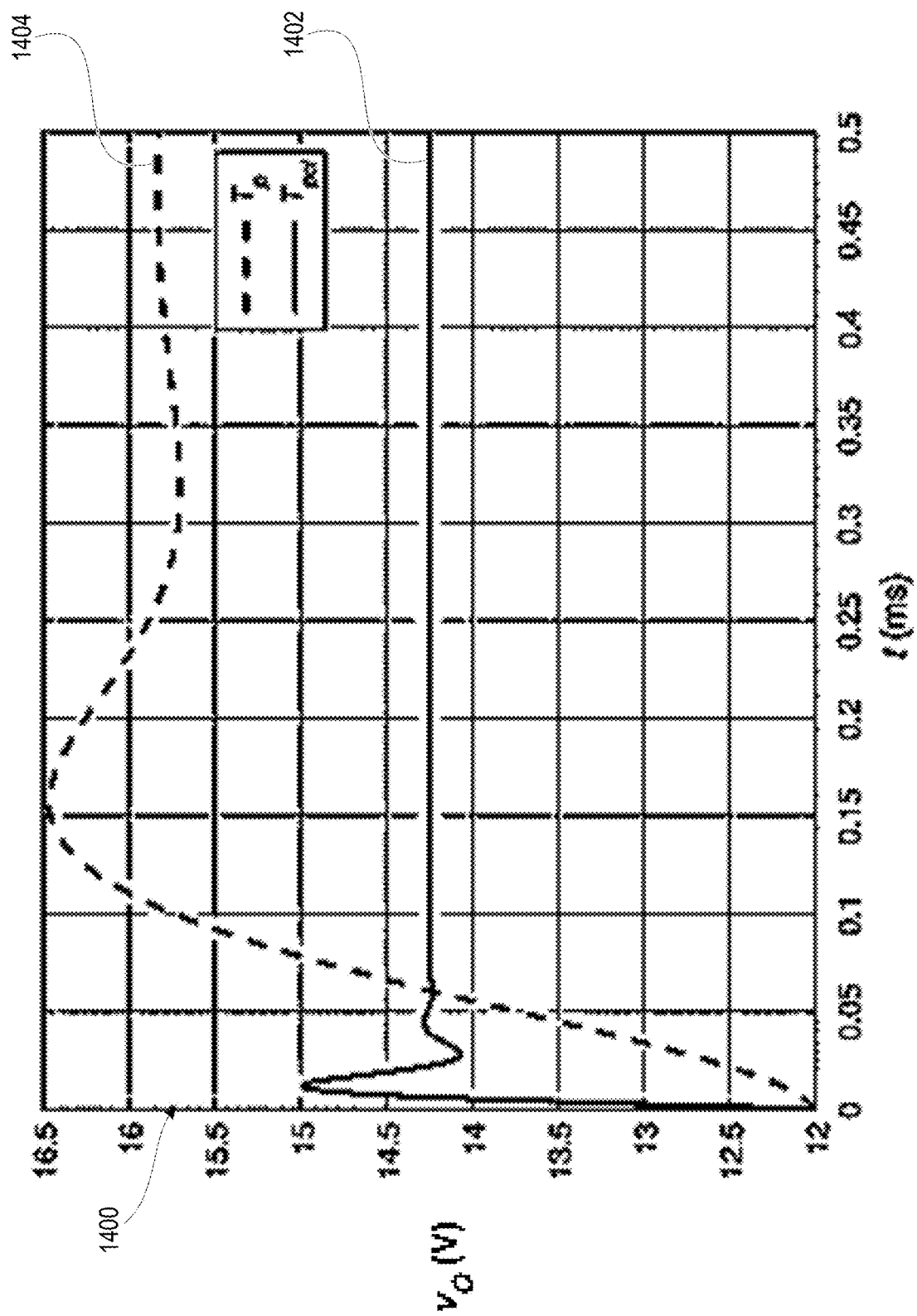
FIG. 14 is a graphical representation illustrating calculated closed-loop control-to-output step response versus open-loop control-to-output step response, according to one or more embodiments.
Figure 15A:
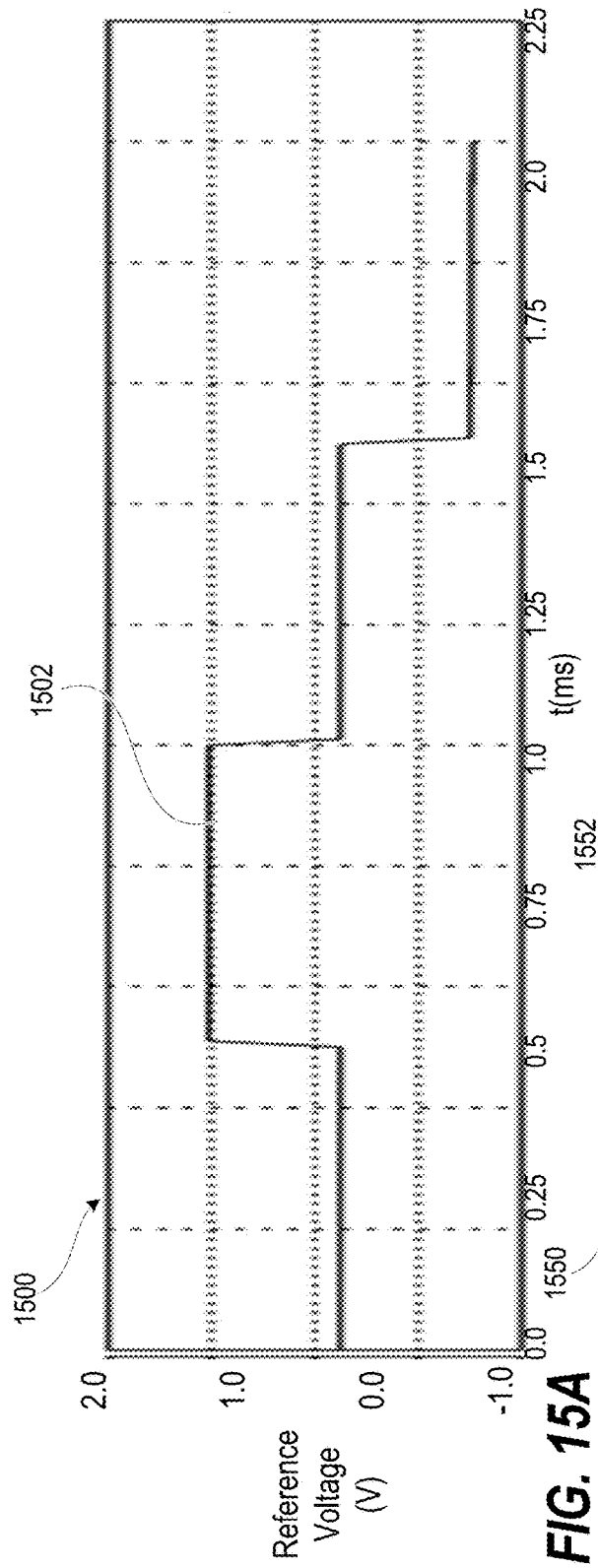
FIGS. 15A-B are graphical representations illustrating simulated closed-loop control-to-output step response, according to one or more embodiments.
Figure 15B:
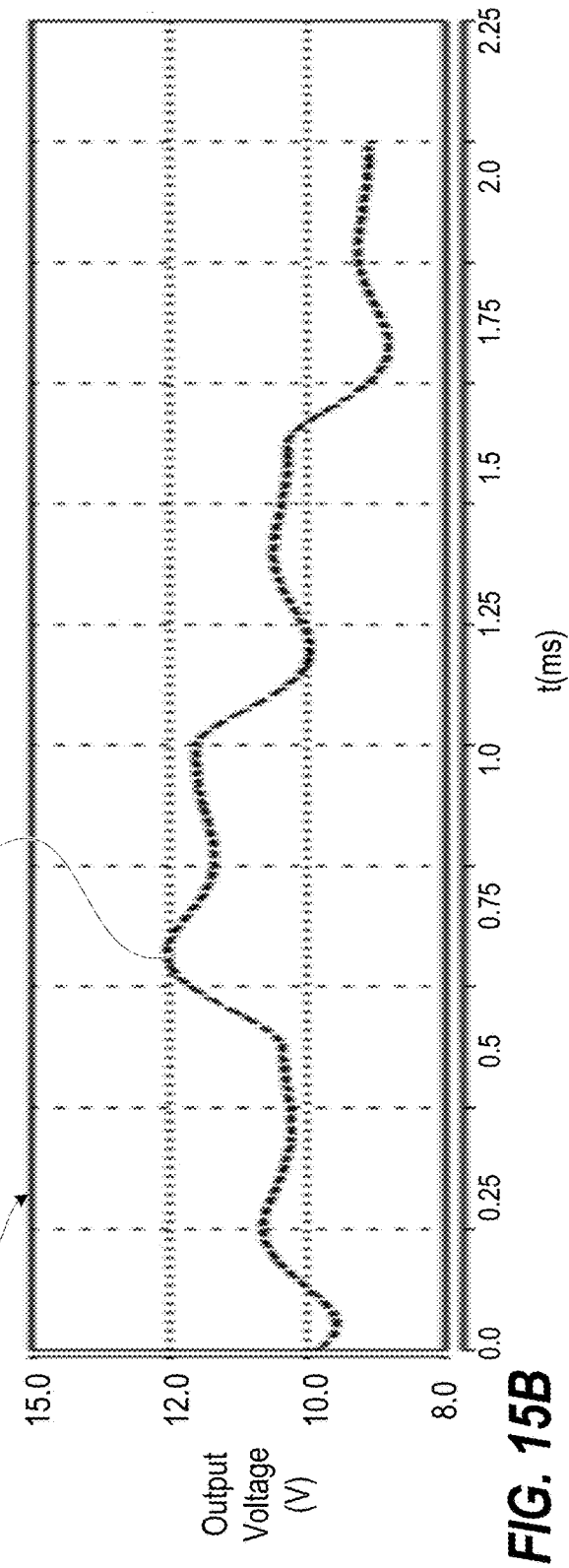

FIGS. 13A-B are graphical representations illustrating simulated closed-loop output impedance step response, depicting the operation at a hard current limit of 1.45 A, as programmed into the disclosed current limiter. During the current limit, function of the voltage mode controller compensates to achieve the desired output voltage "$v_o$" of 12V for the controller, while the current limiter does not allow in excess of its programmed 1.45 A limit. FIG. 14 is a graphical representation illustrating calculated closed-loop control-to-output step response versus open-loop control-to-output step response. Open-loop and closed-loop control-to-output are calculated and compared in FIG. 14. The unit step is a 10% change in reference voltage. FIGS. 15A-B are graphical representations illustrating simulated closed-loop control-to-output step response. FIGS. 14 and 15A-15B are more plots depicting the proper operation of the closed-loop voltage mode control for the full-bridge DC converter.

The open-loop unit-step response causes a calculated steady-state output of approximately 16.8V, while the steady-state closed-loop output also remains relatively unchanged, as designed. This should indicate the worst step response.

The closed-loop input-to-output is tested and found to have approximately 1.6V change in output voltage for unity change on the input, as seen in FIGS. 15A-B. This result underscores the importance of a stable DC reference voltage.

Current Limit Results: The current-limiting circuit is tested. When the load reaches the design maximum of 1.45 A, the duty cycle is interrupted to maintain a current limit of 1.45 A or less. When the control voltage duty cycle drive is interrupted, the output voltage must voltage must fall, limiting the power dissipated into a potentially faulted condition.

Figures 16A, 16B:
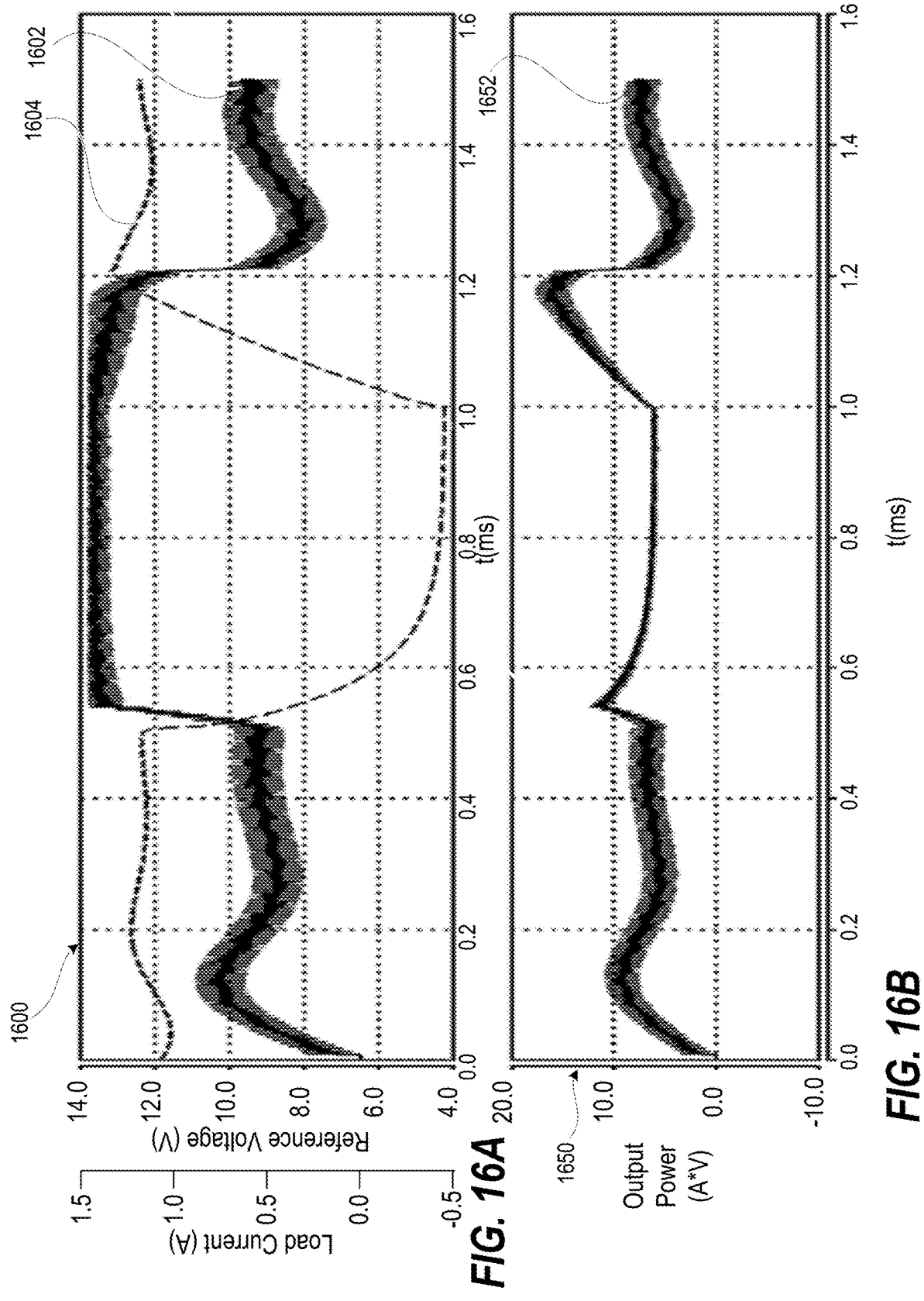
FIGS. 16A-B are graphical representations of reference and output power illustrating simulated current limit results for an over-current condition in the full-bridge DC/DC converter, according to one or more embodiments.

FIGS. 16A-B are graphical representations of reference and output power illustrating simulated current limit results for an over-current condition in the full-bridge DC/DC converter, explicitly depicting the same 1.45 A programmed current limit that was illustrated in FIG. 13A. As illustrated by FIGS. 16A-B, the let-through energy through the over-current condition will be $$U_{OL}(t) = \int_{t_{OL_{start}}}^{t_{OL_{end}}} VI dt \quad \text{(Eqn. 15)}$$

which is limited in this design by minimizing the output voltage, while protecting the switches and conductors from over-current. This effectively limits the worst-case instantaneous output power to simply $$P_{OL,max} = V_{O,max}\left(I_{L,max} + \frac{\Delta I_L}{2}\right) \quad \text{(Eqn. 16)}$$

where $I_{L,max}$ is set by the current limiter's reference voltage $V_{CL,ref}$. However, care must be taken to ensure that inductive flyback current can freewheel through the secondary-side portion of the converter, to suppress $V_O$ in case of a rapid current limit which results in commanded high-rate voltage change. Through this event, the input voltage is not affected, due to the main power transformer isolation. The maximum output power will occur just after the sum of the output current and its ripple, representing peak inductor current, falls below the limit reference voltage threshold $V_{CL,ref}$. This allows the voltage-mode controller to increase the output voltage with near maximum output current.

Figure 17:
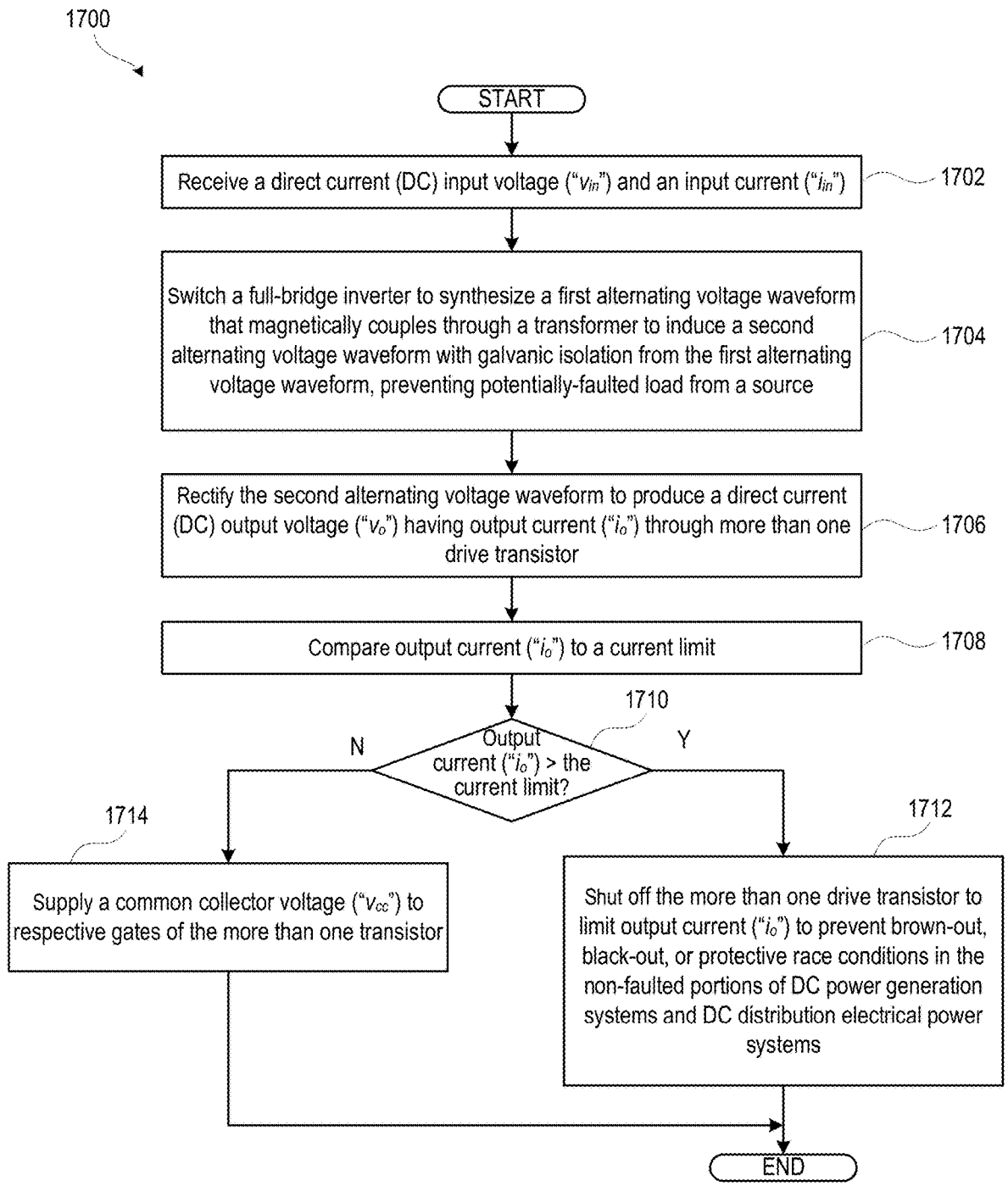
FIG. 17 is a flow diagram illustrating a method of current limiting a power source from a load, according to one or more embodiments.

FIG. 17 is a flow diagram illustrating a method 1700 for galvanically isolating and current limiting a power source from a load. In one or more embodiments, the method 1700 includes receiving a direct current (DC) input voltage ("$v_{in}$") and an input current ("$i_{in}$") (blocks 1702). The method 1700 includes switching a full-bridge inverter to synthesize a first alternating voltage waveform that magnetically couples through a transformer to induce a second alternating voltage waveform with galvanic isolation from the first alternating voltage waveform, preventing potentially-faulted load from a source (block 1704). The method 1700 includes rectifying the second alternating voltage waveform to produce a direct current (DC) output voltage ("$v_o$") having output current ("$i_o$") through more than one drive transistor (block 1706). The method 1700 includes comparing output current ("$i_o$") to a current limit (block 1708). A determination is made, in decision block 1710, whether output current ("$i_o$") being greater than the current limit. In response to output current ("$i_o$") being greater than the current limit, the method 1700 includes shutting off the more than one drive transistor to limit output current ("$i_o$") to prevent brown-out, black-out, or protective race conditions in the non-faulted portions of DC power generation systems and DC distribution electrical power systems (block 1712). Then method 1700 end. In response to output current ("$i_o$") not being greater than the current limit, the method 1700 includes supplying a common collector voltage ("$v_{cc}$") to respective gates of the more than one transistor (block 1714). Then method 1700 end.

The DC/DC converter, wherein the typical Pulse-Width Modulated control loop is designed and intended to properly service its load requirements, lacks inherent capability to dynamically limit high-bandwidth current entering from the source electrical system, as controlled from an external system to maintain power quality and power stability. Certain degraded electrical operating conditions existing on the source system may be further degraded by full operating current availability to some or all loads, beyond typical conditions caused by motor start, capacitive inrush current, or similar phenomena. System insight into currents reaching the load side of the converter allow the greater electric system controller to balance individually-serviced load requirements with changing source electric system resources. The present invention provides capability to insert changeable coarse or fine adjustments, with no additional logic or delaying circuits in the control loop, to set the maximum current allowed to one or more DC/DC converters attached to the source electrical system, to prevent brownout or blackout conditions, and without the need for overly complex redesign of the converter control loop(s). Maximum current limit is ensured by providing the intercepting switch with an inherently-negative gate-source voltage for high-bandwidth turn-off of the typical control loop to the power-handling switches, without an additional logic circuitry required, where the intercepting switch releases the control loop signal when the current has receded to an acceptable level. This configuration always operates per cycle, at switching frequency, to reduce excessive let-through energy to potential electrical fault(s). The current limit may be redefined as suitable to instantly hold current at less than or equal to the limit, rather than trip. The ability to adjust one or more converter current limits dynamically, as dictated by changing source system limitations, also may assist in control of additional hazards induced by inductive voltage kick, which may be catastrophic on platforms such as 270$V_{dc}$ (or greater) aerospace electric systems, operating at elevations with lower atmospheric voltage breakdown.

The present disclosure provides a current limit method which may be used with a conventional voltage mode controller for a converter, where current limitation may be programmed dynamically to improve electrical robustness upon integration with system management control, as well as improvement of electrical fault management. Thus, the novel current limit method is a primary part of the innovation, where the full-bridge buck converter implementation with the novel current limit method illustrates galvanic isolation, where the novel current limit method might limit current against a fault condition or an overload condition. The novel current limit method could indeed be utilized with a voltage-mode controlled converter without a transformer, but a sudden reduction of a high current may induce destructive voltage transients.

It should be noted that the inverter is clearly current limit controlled in this architecture, while the rectifier is not controlled in this instance. Synchronous rectification of the secondary switches is automatic when provided a proper AC electrical signal from the transformer. Active rectification of the secondary switches is compatible with this invention, where greater efficiency and control is desired.

With additional reference to FIG. 1B, the input voltage from the DC bus is $V_{in}$(DC). The first stage is the inverter stage, which transforms power from DC to AC, so that the transformer will induce voltage on the secondary side. The control system for this converter is on the primary side, where the inverter resides. A sufficiently high current, per the transformer design will be limited, and loss of AC waveform leads to loss of coupling through the transformer, providing galvanic isolation. The rectifier in this example circuit simply converts electrical power back to DC to service the DC load at $V_{out}$(DC).

Figure 18:
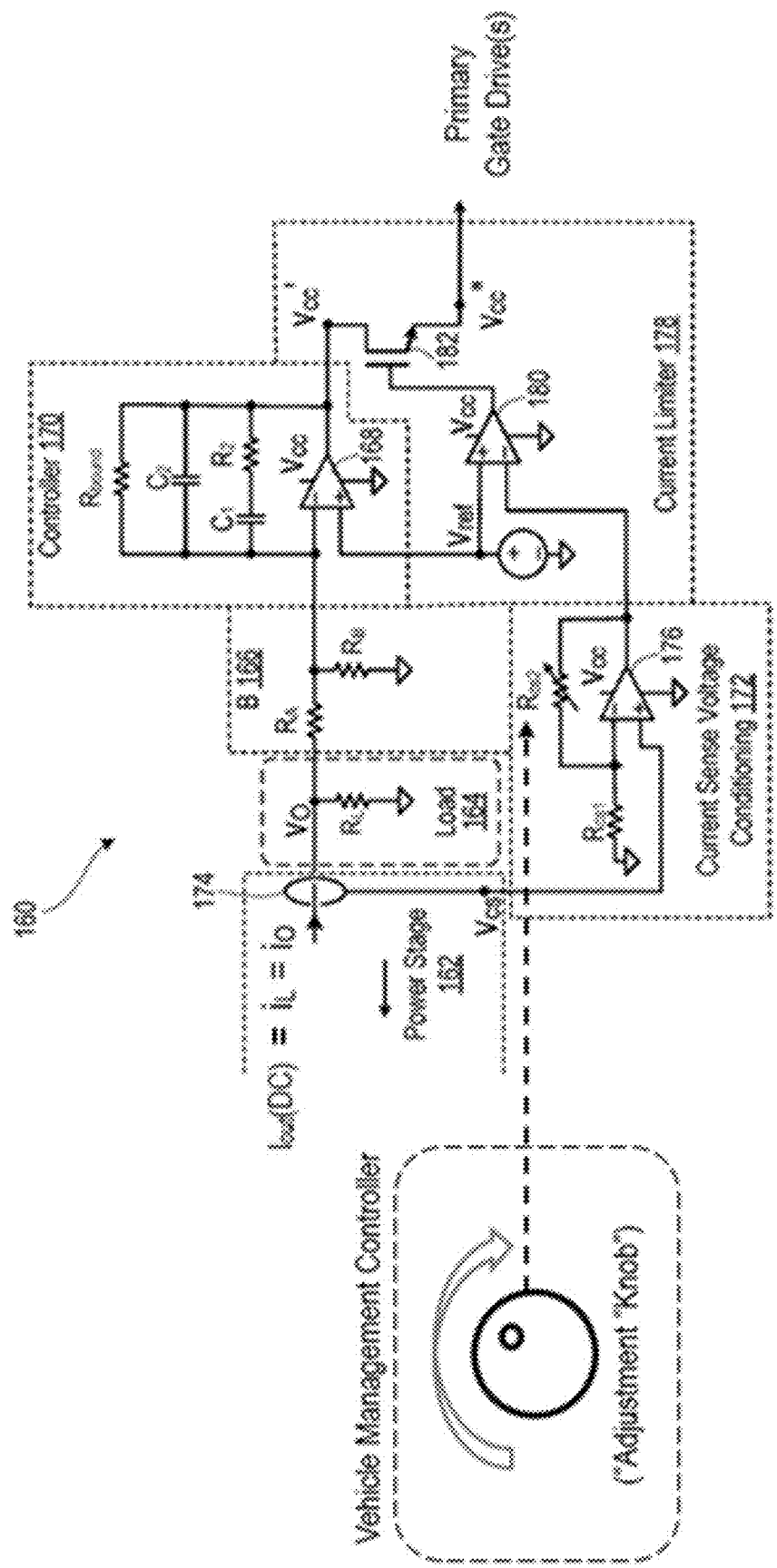
FIG. 18 is a practical illustration for implementation of the voltage mode controller circuit with the disclosed current limit circuit given in FIG. 1D, enabling system-level control of current limit for one or more instantiations of DC converters in a system.

FIG. 18 is a schematic drawing of a voltage mode controller circuit with the novel current limit circuit at 172, enabling system-level control of current limit for one or more instantiations of DC converters in a system, through proper adjustment of any current limit. The controller, which drives the inverter switching devices, is seen in FIG. 18 at 170. The load voltage $V_o$ at 164 is fed to a voltage divider in 166. The chosen controller is a Type II voltage mode controller and is prior art, designed to drive the primary side (inverter) switches via a gate driver. This is enough to regulate the voltage well at the desired output value, but will do nothing to regulate current. Normally, this could be designed with current mode control on an inner control loop, where peak or average current mode control methods may be used, before to the gate drives. However, the current limit, in prior art, must be selected before the design effort, making it difficult or impossible to adjust current limit dynamically, as needed.

System level control of current becomes more important on energy limited platforms, especially in the presence of anomalous conditions. To solve this shortcoming, load current $I_{out}$(DC) is measured and normalized, if needed, and supplied to a non-inverting input on a comparator in 172, as a voltage. The comparator supply voltage is the choice of the designer, but a prudent voltage would be matched to the $V_{GS}$ specified by the gate drive intercept FET. This specific real-time load current reading is compared to a set point on the inverting input. This set point may be supplied directly by a voltage, but likely in a noisy environment, a voltage divider may work better. Resistor $R_{cs2}$ may be a potentiometer, controlled locally or remotely, providing a dynamic operational hook into the current limit. This current limit signal is then passed through to 178, where an additional amplifier latches the gate drive low, providing the fastest turn-off through the FET to intercept the gate drive signal, negating the voltage mode controller output until the measured load current $I_{out}$(DC) drops below the set point. A vehicle or energy management controller, may then program a converter to specifically limit current, much as a knob would be turned, as necessary to conserve energy or to turn off DC power to a load or cut off a fault. Coupled with the full-bridge converter, a potentially rapid turn-off event can prevent a full inductive voltage transient and any subsequent failure of switches by galvanic isolation provided through the transformer. However, the current limit circuit does not require the full-bridge topology to operate: this is simply an example topology conducive to certain requirements.

The input voltage from the DC bus is $V_{in}$(DC). The first stage is the inverter stage, which transforms electrical power from DC to AC, so that the transformer will induce voltage on the secondary side. The control system for this converter is on the primary side, where the inverter resides. A sufficiently high current, per the transformer design will be limited, and loss of AC waveform leads to loss of coupling through the transformer, providing galvanic isolation. The rectifier in this example circuit simply converts electrical power back to DC to service the DC load at $V_{out}$(DC).

Figure 19:
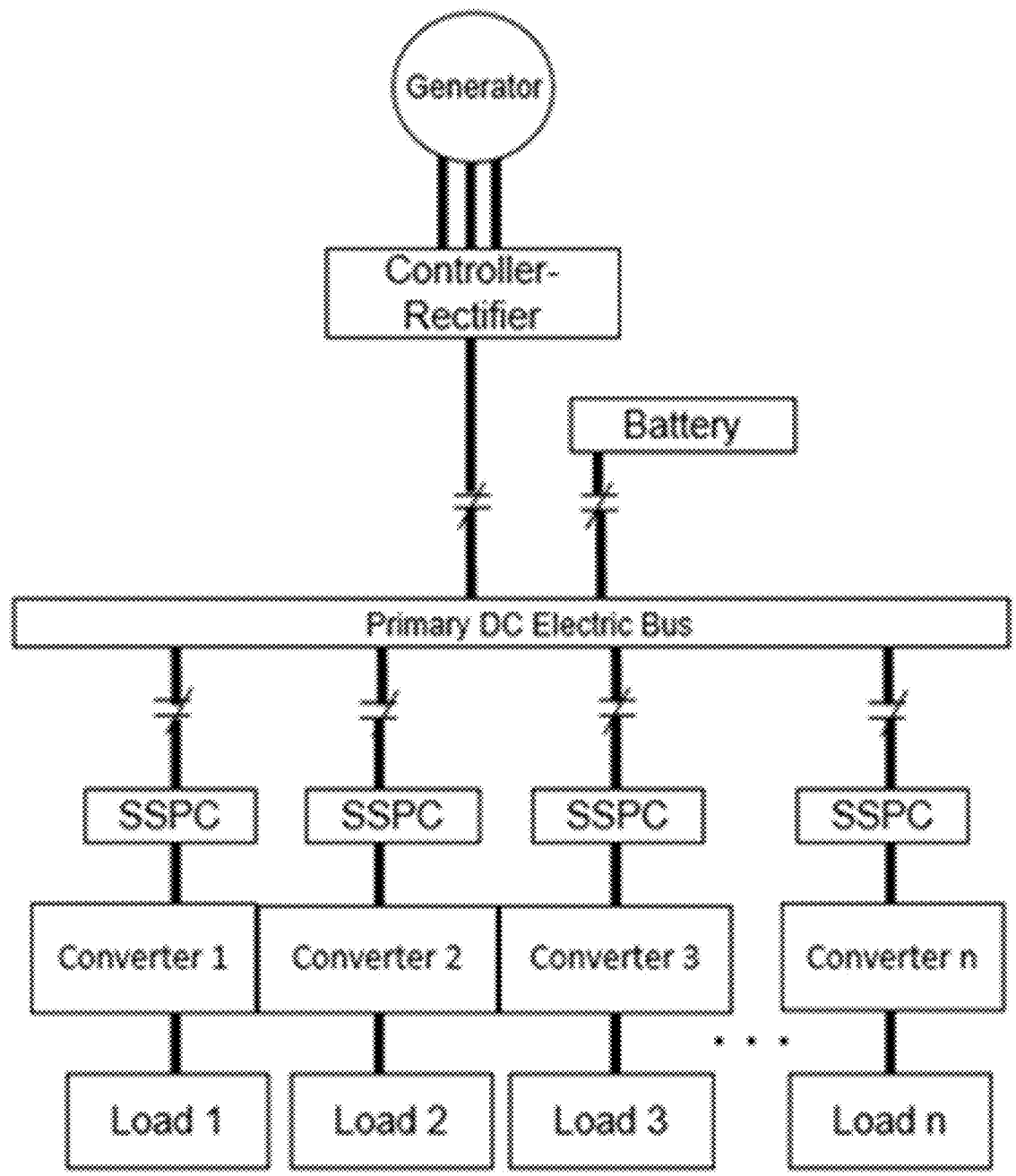
FIG. 19 illustrates an operating generic aerospace system as a single line diagram with traditional protection schemes, requiring multiple protective devices and a conversion device per load.

FIG. 19 illustrates an operating generic aerospace system as a single line diagram with traditional current protection schemes. Each load may require additional voltage regulation off of a primary DC electric bus voltage, where common aerospace bus voltages are $28V_{dc}$ and $270V_{dc}$. Further electrification of aerospace platforms is pushing voltages higher to $540V_{dc}$, $1080V_{dc}$, $2\ kV_{dc}$, and potentially higher. The simplicity of the current limiter implementation disclosed here is such that it is compatible with any of these voltages, as long as the switches on the power stage are rated for the operational voltage. On a legacy implementation, as shown in FIG. 19, the protection inherent to the generator, battery, load contactors, and solid-state power controllers (SSPCs) may be loosely coordinated or not coordinated at all. This could lead to a "race condition," where each independent protection scheme may start its circuit breaking process at various times, which may lead to a complete or partial loss of power to several subsystems or to the entire primary DC electric bus, even if the fault occurred at a lower level. In addition, certain fast-tripping devices, such as SSPCs may need additional coordination with electromechanical contactors to prevent overvoltage damage of solid-state switches, due to feeder inductance and current turn-off bandwidth.

Figure 20:
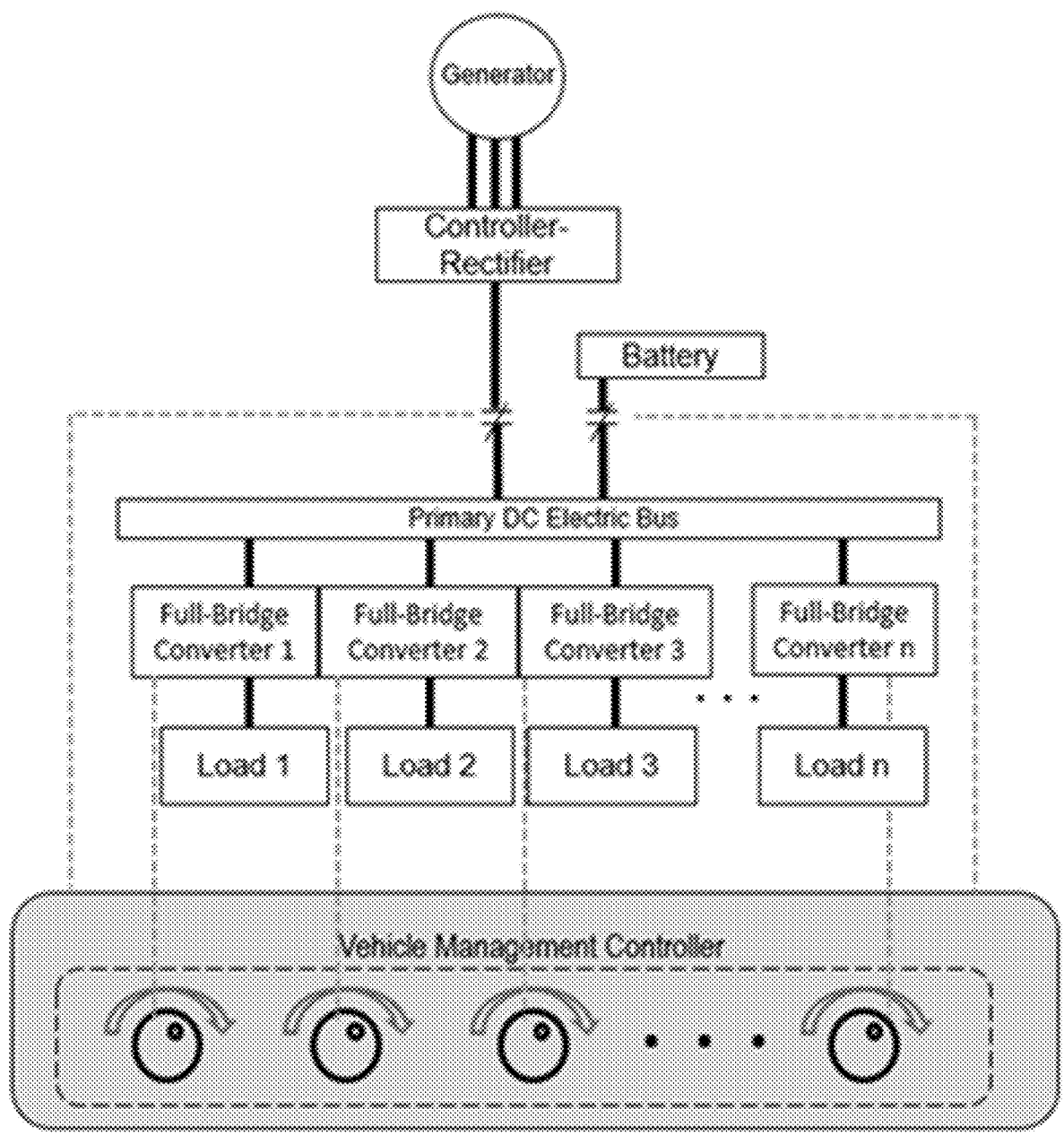
FIG. 20 illustrates potential consolidation of multiple protection and conversion devices per load into a single conversion device with dynamically adjustable current limits, derive from a system controller to operate loads through degraded system conditions.

FIG. 20 illustrates potential consolidation of multiple protection and conversion devices per load into a single conversion device with dynamically adjustable current limits, derived from a system controller to operate loads through degraded system conditions. Thus, a centralized controller to coordinate electrical tripping sequence is desired, yet a simple "control knob" is desired to facilitate current control of disparate loads. An illustration in FIG. 20 of the same electric system with this control scheme shows that the full-bridge converter may combine multiple line-replaceable units (LRUs), to safely and smartly service loads attached to the primary DC electric bus. Direct control of individual current limits provides a potentially cheaper and simpler add-in capability to intelligently manage the electric system. Note that the invention is not dependent on differences between implementations of one versus more than one source: it will work with any of these configurations.

For clarity, the embodiments above describe a full-bridge inverter and a full-bridge rectifier, which together make a full-bridge DC converter that provides higher efficiency in aerospace applications. In one or more embodiments that do not require the same efficiency, a half-bridge inverter and/or a half-bridge rectifier may be used to reduce a part count of a DC converter. In an example, on FIG. 1B, the full-bridge inverter could be turned into a half bridge simply by cutting out switches S3 and S4 (likewise the rectifier on the secondary side could go half bridge by cutting out RS3 and RS4, and/or turning those into diodes since not actively controlled in this configuration. What this effectively does is it only delivers a wave of half the energy available, because the peak of the sine wave (FIG. 1C) will only be half that could be delivered by the full bridge. A designer may opt for a half bridge to save on parts, especially if efficiency is not as important (e.g. there is adequate cooling). In one or more embodiments, the current limit circuit with a half bridge or even a standard DC converter without galvanic isolation through a transformer may be used.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for galvanically isolating a load from a power source and limiting current from the power source to the load, the method comprising:
   receiving a direct current (DC) input voltage and an input current from a power source;
   switching one of a full-bridge inverter and a half-bridge inverter to synthesize a first alternating voltage waveform that magnetically couples through a transformer to induce a second alternating voltage waveform with galvanic isolation from the first alternating voltage waveform, the galvanic isolation provided by the transformer preventing a potentially-faulted load from having a direct electrical connection to the power source;
   rectifying the second alternating voltage waveform to produce a DC output voltage having output current through more than one secondary side transistor;
   current limiting more than one primary side drive transistor to reduce or prevent brown-out, black-out, or protective race conditions in non-faulted portions of DC power generation systems and DC distribution electrical power systems by:
   utilizing a transistor to control a voltage or a current mode control output signal to the gate drive circuitry; and
   utilize negative gate bias to rapidly disable the gate drive signal, without modifying voltage or current mode control design or operation;
   comparing the output current to a programmed current limit;
   in response to the output current being greater than the programmed current limit, shutting off the more than one primary side drive transistor to limit output current; and
   in response to the output current not being greater than the programmed current limit, supplying a common collector voltage to respective gate drives circuitry of the more than one primary side drive transistor.

2. A direct current-direct current (DC-DC) converter for galvanically isolating a load from a power source and limiting current from the power source to the load, the DC-DC converter comprising:
   one of a full-bridge inverter and a half-bridge inverter having an input portion that receives a direct current (DC) input voltage and an input current from a power source and having a power stage, the one of the full-bridge inverter and the half-bridge inverter feeding a transformer that galvanically isolates the input portion from the output;
   a controller having gate drives circuitry that switch the one of the full-bridge inverter and the half-bridge inverter to synthesize a first alternating voltage waveform that magnetically couples through the transformer to induce a second alternating voltage waveform with galvanic isolation from the first alternating voltage waveform, preventing a potentially-faulted load from having a direct electrical connection to the power source;
   one of a full-bridge rectifier and a half-bridge rectifier having the power stage that rectifies the second alternating voltage waveform to produce a DC output voltage having output current through more than one secondary side transistors; and
   a current limiter that current limits more than one primary side drive transistor to reduce or prevent brown-out, black-out, or protective race conditions in non-faulted portions of DC power generation systems and DC distribution electrical power systems, the current limiter configured to:
   utilize a transistor to control a voltage or a current mode control output signal to the gate drive circuitry;
   compare the output current to a programmed current limit, once per cycle;
   utilize negative gate bias to rapidly disable the gate drive signal, without modifying voltage or current mode control design or operation;
   shut off the more than one primary side drive transistor to limit output current in response to the output current being greater than the programmed current limit; and
   supply a common collector voltage to respective gates of the more than one primary side drive transistor in response to the output current not being greater than the programmed current limit.

3. The DC-DC converter of claim 2, wherein:
   the one of the full-bridge inverter and the half-bridge inverter comprises a full-bridge inverter; and the one of the full-bridge rectifier and the half-bridge rectifier comprises a full-bridge rectifier.

\* \* \* \* \*